(12) United States Patent
Zhou

(10) Patent No.: US 12,470,727 B2
(45) Date of Patent: Nov. 11, 2025

(54) SUB-PICTURES FOR PIXEL RATE BALANCING

(71) Applicant: Texas Instruments Incorporated, Dallas, TX (US)

(72) Inventor: Minhua Zhou, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/242,241

(22) Filed: Sep. 5, 2023

(65) Prior Publication Data
US 2023/0421789 A1 Dec. 28, 2023

Related U.S. Application Data

(63) Continuation of application No. 17/748,619, filed on May 19, 2022, now Pat. No. 11,758,163, which is a continuation of application No. 17/115,165, filed on Dec. 8, 2020, now Pat. No. 11,350,117, which is a continuation of application No. 16/260,225, filed on
(Continued)

(51) Int. Cl.
H04N 19/436 (2014.01)
H04N 19/513 (2014.01)

(52) U.S. Cl.
CPC ......... H04N 19/436 (2014.11); H04N 19/521 (2014.11)

(58) Field of Classification Search
CPC .......................... H04N 19/436; H04N 19/521
See application file for complete search history.

(56) References Cited

U.S. PATENT DOCUMENTS 5,379,070 A 1/1995 Retter et al.
5,815,209 A 9/1998 Kondo et al.
(Continued)

FOREIGN PATENT DOCUMENTS

WO WO-2009033432 A1 * 3/2009 ........... H04N 19/126

OTHER PUBLICATIONS

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.
(Continued)

Primary Examiner — Tracy Y. Li
(74) Attorney, Agent, or Firm — Carl G. Peterson; Frank D. Cimino

(57) ABSTRACT

A method for decoding a compressed video bit stream in a video decoder to recover a video sequence, the video decoder including a plurality of decoder processing cores is provided. The method includes determining that a picture is encoded in the compressed bit stream as a pre-determined number of independently encoded sub-pictures, and dispatching a first encoded sub-picture of the pre-determined number of sub-pictures to a first decoder processing core of the plurality of decoder processing cores and a second encoded sub-picture of the pre-determined number of sub-pictures to a second decoder processing core of the plurality of decoder processing cores, wherein the first encoded sub-picture and the second encoded sub-picture are independently decoded in parallel on the respective first and second decoder processing cores.

20 Claims, 18 Drawing Sheets

Related U.S. Application Data

Jan. 29, 2019, now Pat. No. 10,893,284, which is a continuation of application No. 13/757,791, filed on Feb. 2, 2013, now Pat. No. 10,244,246.

(60) Provisional application No. 61/637,406, filed on Apr. 24, 2012, provisional application No. 61/622,218, filed on Apr. 10, 2012, provisional application No. 61/615,592, filed on Mar. 26, 2012, provisional application No. 61/614,131, filed on Mar. 22, 2012, provisional application No. 61/607,048, filed on Mar. 6, 2012, provisional application No. 61/593,944, filed on Feb. 2, 2012.

(56) References Cited

U.S. PATENT DOCUMENTS

| | | | |
|---|---|---|---|
| 8,542,748 | B2 | 9/2013 | Zhao et al. |
| 10,893,284 | B2 | 1/2021 | Zhou |
| 2006/0268989 | A1* | 11/2006 | Kadono .............. H04N 19/467 375/E7.199 |
| 2009/0245349 | A1 | 10/2009 | Zhao |
| 2010/0098155 | A1 | 4/2010 | Demircin et al. |
| 2010/0135416 | A1 | 6/2010 | Huang et al. |
| 2011/0194613 | A1 | 8/2011 | Chen et al. |
| 2012/0106622 | A1 | 5/2012 | Huang et al. |
| 2012/0121018 | A1 | 5/2012 | Kustka et al. |
| 2012/0140816 | A1 | 6/2012 | Franche et al. |
| 2012/0140832 | A1 | 6/2012 | Sjoberg et al. |
| 2012/0163453 | A1* | 6/2012 | Horowitz .............. H04N 19/174 375/E7.243 |
| 2012/0183074 | A1 | 7/2012 | Fuldseth |
| 2012/0189049 | A1* | 7/2012 | Coban .................... H04N 19/96 375/E7.125 |
| 2012/0201294 | A1 | 8/2012 | Segall et al. |
| 2012/0230428 | A1* | 9/2012 | Segall ................. H04N 19/174 375/240.25 |
| 2013/0016771 | A1* | 1/2013 | Misra .................... H04N 19/55 375/240.09 |
| 2013/0016786 | A1 | 1/2013 | Segall |
| 2013/0083839 | A1 | 4/2013 | Yang et al. |

OTHER PUBLICATIONS

Gordon Clare et al, "Wavefront Parallel Processing for HEVC Encoding and Decoding", JCTVC-F274, Joint Collaborative Team on Video Coding (JCT-VC) of ITU-T SG16 WP3 and ISO/IEC JTC1/SC29/WG11, pp. 1-16, Jul. 14-22, 2011, Torino, Italy.

Gordon Clare et al, "Wavefront Parallel Processing (WPP)", JCTVC-F274 Presentation, Joint Collaborative Team on Video Coding (JCT-VC) of ITU-T SG16 WP3 and ISO/IEC JTC1/SC29/WG11, pp. 1-18, Jul. 14-22, 2011, Torino, Italy.

Arild Fuldseth et al, "Tiles", JCTVC-F335, Joint Collaborative Team on Video Coding (JCT-VC) of ITU-T SG16 WP3 and ISO/IEC JTC1/SC29/WG11, pp. 1-15, Jul. 14-22, 2011, Torino, Italy.

Arild Fuldseth et al, "Tiles", JCTVC-F335 Presentation, Joint Collaborative Team on Video Coding (JCT-VC) of ITU-T SG16 WP3 and ISO/IEC JTC1/SC29/WG11, pp. 1-12, Jul. 14-22, 2011, Torino, Italy.

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-217, Jul. 14-22, 2011, Torino, Italy.

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-223, Nov. 21-30, 2011, Geneva, Switzerland.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-249, Feb. 1-10, 2012, San Jose, CA.

Minhua Zhou, "AHG4: Enable Parallel Decoding with Tiles", JCTVC-I0118, Joint Collaborative Team on Video Coding (JCT-VC) of ITU-T SG16 WP3 and ISO/IEC JTC1/SC29/WG11, pp. 1-9, Apr. 27-May 7, 2012, Geneva, Switzerland.

Benjamin Bross et al, "High Efficiency Video Coding (HEVC) Text Specification Draft 7", JCTVC-I1003_d1, Joint Collaborative Team on Video Coding (JCT-VC) of ITU-T SG16 WP3 and ISO/IEC JTC1/SC29/WG11, pp. 1-256, Apr. 27-May 7, 2012, Geneva, Switzerland.

Minhua Zhou, "AHG4: Signaling Sub-Stream Entries in APS for Paralleling Decoding", JCTVC-J0081, Joint Collaborative Team on Video Coding (JCT-VC) of ITU-T SG16 WP3 and ISO/IEC JTC1/SC29/WG11, pp. 1-4, Jul. 11-20, 2012, Stockholm, Sweden.

Minhua Zhou, "AHG4: Enable Parallel Decoding with Tiles", JCTVC-J0088, Joint Collaborative Team on Video Coding (JCT-VC) of ITU-T SG16 WP3 and ISO/IEC JTC1/SC29/WG11, pp. 1-7, Jul. 11-20, 2012, Stockholm, Sweden.

Minhua Zhou and Vivienne Sze, "AHG4: Enable Parallel Decoding with Tiles", JCTVC-J0088 Presentation, Joint Collaborative Team on Video Coding (JCT-VC) of ITU-T SG16 WP3 and ISO/IEC JTC1/SC29/WG11, pp. 1-10, Jul. 11-20, 2012, Stockholm, Sweden.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-250, Jul. 11-20, 2012, Stockholm, Sweden.

Minhua Zhou, "AHG4: Sub-Stream Entry Points SEI Message", JCTVC-K0200, Joint Collaborative Team on Video Coding (JCT-VC) of ITU-T SG16 WP3 and ISO/IEC JTC1/SC29/WG11, pp. 1-8, Oct. 10-19, 2012, Shanghai, China.

Minhua Zhou, AHG9: Thread Entry Points SEI Message, JCTVC-K0200_r1 Presentation, Joint Collaborative Team on Video Coding (JCT-VC) of ITU-T SG16 WP3 and ISO/IEC JTC1/SC29/WG11, pp. 1-7, Oct. 10-19, 2012, Shanghai, China.

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, pp. 1-293, Oct. 10-19, 2012, Shanghai, China.

"TMS320DM6467 Digital Media System-on-Chip", SPRS403G, Texas Instruments Incorporated, Dec. 2007, revised Oct. 2010, pp. 1-355.

* cited by examiner

| LEVEL | MAXIMUM LUMA PIXEL RATE MaxLumaPR (SAMPLES/SEC) | MAXIMUM LUMA PICTURE SIZE MaxLumaFS (SAMPLES) | MAXIMUM BIT RATE MaxBR (1000 BITS/S) | MINIMUM COMPRESSION RATIO MinCR | MaxDpbSize (PICTURE STORAGE BUFFERS) | MAXIMUM CPB SIZE (1000 BITS) | NUMBER OF SUB-PICS (num_subpic_cols, num_subpic_rows) |
|---|---|---|---|---|---|---|---|
| 1 | 552,960 | 36,864 | 128 | 2 | 6 | 350 | (1,1) |
| 2 | 3,686,400 | 122,880 | 1,000 | 2 | 6 | 1,000 | (1,1) |
| 3 | 13,762,560 | 458,752 | 5,000 | 2 | 6 | 5,000 | (1,1) |
| 3.1 | 33,177,600 | 983,040 | 9,000 | 2 | 6 | 9,000 | (1,1) |
| 4 | 62,668,800 | 2,088,960 | 15,000 | 4 | 6 | 15,000 | (1,1) |
| 4.1 | 62,668,800 | 2,088,960 | 30,000 | 4 | 6 | 30,000 | (1,1) |
| 4.2 | 133,693,440 | 2,228,224 | 30,000 | 4 | 6 | 30,000 | (1,1) |
| 4.3 | 133,693,440 | 2,228,224 | 50,000 | 6 | 6 | 50,000 | (2,1) |
| 5 | 267,386,880 | 8,912,896 | 50,000 | 8 | 6 | 50,000 | (2,1) |
| 5.1 | 267,386,880 | 8,912,896 | 100,000 | 8 | 6 | 100,000 | (2,2) |
| 5.2 | 534,773,760 | 8,912,896 | 150,000 | 8 | 6 | 150,000 | (4,2) |
| 6 | 1,002,700,800 | 33,423,360 | 300,000 | 8 | 6 | 300,000 | (4,4) |
| 6.1 | 2,005,401,600 | 33,423,360 | 500,000 | 6 | 6 | 500,000 | (4,8) |
| 6.2 | 4,010,803,200 | 33,423,360 | 800,000 | 6 | 6 | 800,000 | |

FIG. 8

| LEVEL | MAXIMUM LUMA PIXEL RATE MaxLumaPR (SAMPLES/SEC) | MAXIMUM LUMA PICTURE SIZE MaxLumaFS (SAMPLES) | MAXIMUM BIT RATE MaxBR (1000 BITS/S) | MINIMUM COMPRESSION RATIO MinCR | MaxDpbSize (PICTURE STORAGE BUFFERS) | MAXIMUM CPB SIZE (1000 BITS) | NUMBER OF SUB-PICS (num_subpic_cols, num_subpic_rows) |
|---|---|---|---|---|---|---|---|
| 1 | 552,960 | 36,864 | 128 | 2 | 6 | 350 | (1,1) |
| 2 | 3,686,400 | 122,880 | 1,000 | 2 | 6 | 1,000 | (1,1) |
| 3 | 13,762,560 | 458,752 | 5,000 | 2 | 6 | 5,000 | (1,1) |
| 3.1 | 33,177,600 | 983,040 | 9,000 | 2 | 6 | 9,000 | (1,1) |
| 4 | 62,668,800 | 2,088,960 | 15,000 | 4 | 6 | 15,000 | (1,1) |
| 4.1 | 62,668,800 | 2,088,960 | 30,000 | 4 | 6 | 30,000 | (1,1) |
| 4.2 | 133,693,440 | 2,228,224 | 30,000 | 4 | 6 | 30,000 | (1,1) |
| 4.3 | 133,693,440 | 2,228,224 | 50,000 | 6 | 6 | 50,000 | (1,1) |
| 5 | 267,386,880 | 8,912,896 | 50,000 | 8 | 6 | 50,000 | (1,1) |
| 5.1 | 267,386,880 | 8,912,896 | 100,000 | 8 | 6 | 100,000 | (1,1) |
| 5.2 | 534,773,760 | 8,912,896 | 150,000 | 8 | 6 | 150,000 | (1,2) |
| 6 | 1,002,700,800 | 33,423,360 | 300,000 | 8 | 6 | 300,000 | (2,2) |
| 6.1 | 2,005,401,600 | 33,423,360 | 500,000 | 8 | 6 | 500,000 | (2,4) |
| 6.2 | 4,010,803,200 | 33,423,360 | 800,000 | 6 | 6 | 800,000 | (2,8) |

FIG. 9

| LEVEL | MAXIMUM LUMA PIXEL RATE MaxLumaPR (SAMPLES/SEC) | MAXIMUM LUMA PICTURE SIZE MaxLumaFS (SAMPLES) | MAXIMUM BIT RATE MaxBR (1000 BITS/S) | MINIMUM COMPRESSION RATIO MinCR | MAXDpbSize (PICTURE STORAGE BUFFERS) | MAXIMUM CPB SIZE (1000 BITS) | NUMBER OF SUB-PICTURES (num_subpic_cols x num_subpic_rows) | min_num_subpic_cols |
|---|---|---|---|---|---|---|---|---|
| 1 | 552,960 | 36,864 | 128 | 2 | 6 | 350 | 1 | 1 |
| 2 | 3,686,400 | 122,880 | 1,000 | 2 | 6 | 1,000 | 1 | 1 |
| 3 | 13,762,560 | 458,752 | 5,000 | 2 | 6 | 5,000 | 1 | 1 |
| 3.1 | 33,177,600 | 983,040 | 9,000 | 2 | 6 | 9,000 | 1 | 1 |
| 4 | 62,668,800 | 2,088,960 | 15,000 | 4 | 6 | 15,000 | 1 | 1 |
| 4.1 | 62,668,800 | 2,088,960 | 30,000 | 4 | 6 | 30,000 | 1 | 1 |
| 4.2 | 133,693,440 | 2,228,224 | 30,000 | 4 | 6 | 30,000 | 1 | 1 |
| 4.3 | 133,693,440 | 2,228,224 | 50,000 | 6 | 6 | 50,000 | 1 | 1 |
| 5 | 267,386,880 | 8,912,896 | 50,000 | 8 | 6 | 50,000 | 2 | 1 |
| 5.1 | 267,386,880 | 8,912,896 | 100,000 | 8 | 6 | 100,000 | 2 | 2 |
| 5.2 | 534,773,760 | 8,912,896 | 150,000 | 8 | 6 | 150,000 | 4 | 2 |
| 6 | 1,002,700,800 | 33,423,360 | 300,000 | 8 | 6 | 300,000 | 8 | 4 |
| 6.1 | 2,005,401,600 | 33,423,360 | 500,000 | 6 | 6 | 500,000 | 16 | 4 |
| 6.2 | 4,010,803,200 | 33,423,360 | 800,000 | 6 | 6 | 800,000 | 32 | 8 |

FIG. 10

| LEVEL | MAXIMUM LUMA PIXEL RATE MaxLumaPR (SAMPLES/SEC) | MAXIMUM LUMA PICTURE SIZE MaxLumaFS (SAMPLES) | MAXIMUM BIT RATE MaxBR (1000 BITS/S) | MINIMUM COMPRESSION RATIO MinCR | MaxDpbSize (PICTURE STORAGE BUFFERS) | MAXIMUM CPB SIZE (1000 BITS) | NUMBER OF SUB-PICTURES (num_subpic_cols x num_subpic_rows) | min_num_subpic_cols |
|---|---|---|---|---|---|---|---|---|
| 1 | 552,960 | 36,864 | 128 | 2 | 6 | 350 | 1 | 1 |
| 2 | 3,686,400 | 122,880 | 1,000 | 2 | 6 | 1,000 | 1 | 1 |
| 3 | 13,762,560 | 458,752 | 5,000 | 2 | 6 | 5,000 | 1 | 1 |
| 3.1 | 33,177,600 | 983,040 | 9,000 | 2 | 6 | 9,000 | 1 | 1 |
| 4 | 62,668,800 | 2,088,960 | 15,000 | 4 | 6 | 15,000 | 1 | 1 |
| 4.1 | 62,668,800 | 2,088,960 | 30,000 | 4 | 6 | 30,000 | 1 | 1 |
| 4.2 | 133,693,440 | 2,228,224 | 30,000 | 4 | 6 | 30,000 | 1 | 1 |
| 4.3 | 133,693,440 | 2,228,224 | 50,000 | 4 | 6 | 50,000 | 1 | 1 |
| 5 | 267,386,880 | 8,912,896 | 50,000 | 6 | 6 | 50,000 | 1 | 1 |
| 5.1 | 267,386,880 | 8,912,896 | 100,000 | 8 | 6 | 100,000 | 1 | 1 |
| 5.2 | 534,773,760 | 8,912,896 | 150,000 | 8 | 6 | 150,000 | 2 | 2 |
| 6 | 1,002,700,800 | 33,423,360 | 300,000 | 8 | 6 | 300,000 | 4 | 2 |
| 6.1 | 2,005,401,600 | 33,423,360 | 500,000 | 8 | 6 | 500,000 | 8 | 4 |

FIG. 11

SUB-PICTURES FOR PIXEL RATE BALANCING

CROSS-REFERENCE TO RELATED APPLICATIONS

This application is a continuation of U.S. patent application Ser. No. 17/748,619, filed May 19, 2022, scheduled to grant as U.S. Pat. No. 11,758,163 on Sep. 12, 2023, which is a continuation of U.S. patent application Ser. No. 17/115,165, filed Dec. 8, 2020 (U.S. Pat. No. 11,350,117), which is a continuation of U.S. patent application Ser. No. 16/260,225, filed Jan. 29, 2019 (now U.S. Pat. No. 10,893,284), which is a continuation of U.S. patent application Ser. No. 13/757,791, filed Feb. 2, 2013 (now U.S. Pat. No. 10,244,246), which claims benefit of U.S. Provisional Patent Application Ser. No. 61/593,944, filed Feb. 2, 2012, U.S. Provisional Patent Application Ser. No. 61/607,048, filed Mar. 6, 2012, U.S. Provisional Patent Application Ser. No. 61/614,131, filed Mar. 22, 2012, U.S. Provisional Patent Application Ser. No. 61/615,592, filed Mar. 26, 2012, U.S. Provisional Patent Application Ser. No. 61/622,218, filed Apr. 10, 2012, and U.S. Provisional Patent Application Ser. No. 61/637,406, filed Apr. 24, 2012, each of which are incorporated herein by reference in their entirety.

BACKGROUND OF THE INVENTION

Field of the Invention

Embodiments of the present invention generally relate to pixel rate balancing across multiple processing cores in video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra-prediction. The resulting prediction error is coded by applying block transforms based on an integer approximation of the discrete cosine transform, which is followed by quantization and entropy coding of the transform coefficients.

To support coding on multi-core computing platforms, some parallel-processing tools are included in HEVC. In addition to the slices introduced in H.264/AVC, these tools include tiling, wavefront parallel processing, and entropy slices. These parallel-processing tools have been defined with the focus mostly on ensuring that if the tools are used in an encoder, a significant burden is not imposed on a single core decoder. However, for ultra high definition (UHD) video coding, multi-core devices are needed in both the encoder and the decoder. It is important that HEVC (and future video coding standards) enables parallel processing capability on the decoder side as well as on the encoder side.

SUMMARY

Embodiments of the present invention relate to methods, apparatus, and computer readable media for pixel rate balancing across multiple processing cores in video coding. In one aspect, a method for decoding a compressed video bit stream in a video decoder to recover a video sequence, the video decoder including a plurality of decoder processing cores is provided. The method includes determining that a picture is encoded in the compressed bit stream as a pre-determined number of independently encoded sub-pictures, and dispatching a first encoded sub-picture of the pre-determined number of sub-pictures to a first decoder processing core of the plurality of decoder processing cores and a second encoded sub-picture of the pre-determined number of sub-pictures to a second decoder processing core of the plurality of decoder processing cores, wherein the first encoded sub-picture and the second encoded sub-picture are independently decoded in parallel on the respective first and second decoder processing cores.

In one aspect, a method for encoding a digital video sequence in a video encoder to generate a compressed video bit stream is provided, the video encoder comprising a plurality of encoder processing cores. The method includes partitioning a picture into a pre-determined number of sub-pictures, wherein each sub-picture can be independently encoded, dispatching a first sub-picture of the pre-determined number of sub-pictures to a first encoder processing core of the plurality of encoder processing cores and a second sub-picture of the pre-determined number of sub-pictures to a second encoder processing core of the plurality of encoder processing cores, and encoding the first sub-picture and the second sub-picture in parallel on the respective first and second encoder processing cores.

BRIEF DESCRIPTION OF THE DRAWINGS

Particular embodiments will now be described, by way of example only, and with reference to the accompanying drawings:

FIGS. 8-11 are example level tables including sub-picture information;

DETAILED DESCRIPTION OF EMBODIMENTS OF THE INVENTION

Figure 1:
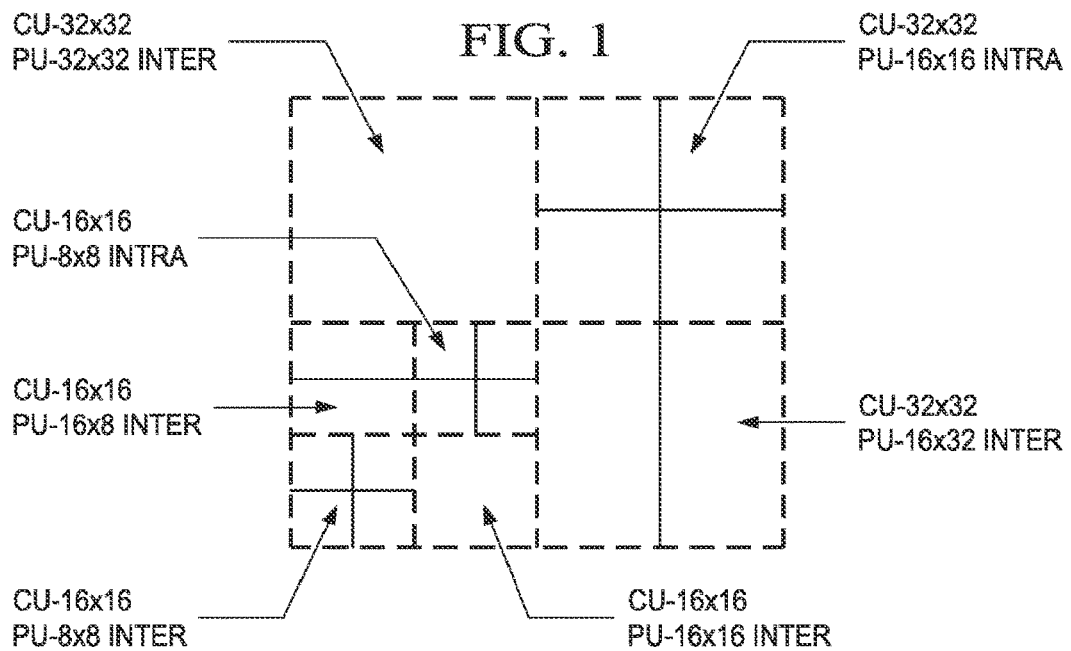
FIG. 1 is an example of quadtree based largest coding unit (LCU) decomposition.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments may be described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CUs) and CUs may be partitioned into prediction units (PUs). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) specified for a picture. In recent versions of HEVC, the minimum CU size permitted is 8×8.

The coding node is the root node of two trees, a prediction tree and a transform tree. A prediction tree specifies the position and size of prediction units (PU) for a CU. A transform tree specifies the position and size of transform units (TU) for a CU. A transform unit may not be larger than a CU and the size of a transform unit may be 4×4, 8×8, 16×16, and 32×32. The sizes of the TUs and PUs for a CU are determined by the video encoder during prediction based on minimization of rate/distortion costs. FIG. 1 shows an example of a quadtree based LCU to CU/PU decomposition structure in which the size of the SCU is 16×16 and the size of the LCU is 64×64.

Reference is made herein to a sequence parameter set (SPS), a picture parameter set (PPS), an adaptation parameter set (APS), and a slice header. An SPS is a set of parameters signaled at the beginning of a compressed bit stream that apply by default to the decoding of the entire compressed bit stream. A PPS is a set of parameters signaled in the compressed bit stream that apply to the decoding of one or more subsequent pictures. An APS is also a set of parameters signaled in the compressed bit stream that apply to the decoding of one or more subsequent pictures. An APS is used to code picture parameters that are likely to change from picture to picture while a PPS is used to code picture parameters that are unlikely to change from picture to picture. A slice is a sequence of LCUs in a picture that may be decoded independently from LCUs in other slices in the picture. A slice header is a set of parameters signaled in the compressed stream that apply to a slice.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, March 16-23, 2011 ("WD3"), B. Bross, et al., "WD4: Working Draft 4 of High-Efficiency Video Coding," JCTVC-F803_ d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T SG16 WP3 and ISO/IEC JTC1/SC29/WG1, San Jose, California, Feb. 1-10, 2012, ("HEVC Draft 6"), B. Bross, et al., "High Efficiency Video Coding (HEVC) Text Specification Draft 7," JCTVC-11003_ d1, Joint Collaborative Team on Video Coding (JCT-VC) of ITU-T SG16 WP3 and ISO/IEC JTC1/SC29/WG1, Geneva, CH, April 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), and B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9").

Some aspects of this disclosure have been presented to the JCT-VC in M. Zhou, "AHG4: Enable Parallel Decoding with Tiles," JCTVC-I0118, Joint Collaborative Team on Video Coding (JCT-VC) of ITU-T SG16 WP3 and ISO/IEC JTC1/SC29/WG11, Geneva, CH, April 27-May 7, 2012, M. Zhou, "AHG4: Signaling Sub-Stream Entries in APS for Parallel Decoding," JCTVC-J0081, Joint Collaborative Team on Video Coding (JCT-VC) of ITU-T SG16 WP3 and ISO/IEC JTC1/SC29/WG11, Stockholm, Sweden, Jul. 11-20, 2012, M. Zhou, "AHG4: Enable Parallel Decoding with Tiles," JCTVC-J0088, Joint Collaborative Team on Video Coding (JCT-VC) of ITU-T SG16 WP3 and ISO/IEC JTC1/SC29/WG11, Stockholm, Sweden, Jul. 11-20, 2012, and M. Zhou, "AHG4: Sub-Stream Entry Points SEI Message," JCTVC-K0200, Joint Collaborative Team on Video Coding (JCT-VC) of ITU-T SG16 WP3 and ISO/IEC JTC1/SC29/WG11, Shanghai, China, Oct. 10-19, 2012, all of which are incorporated by reference herein in their entirety.

Figure 2:
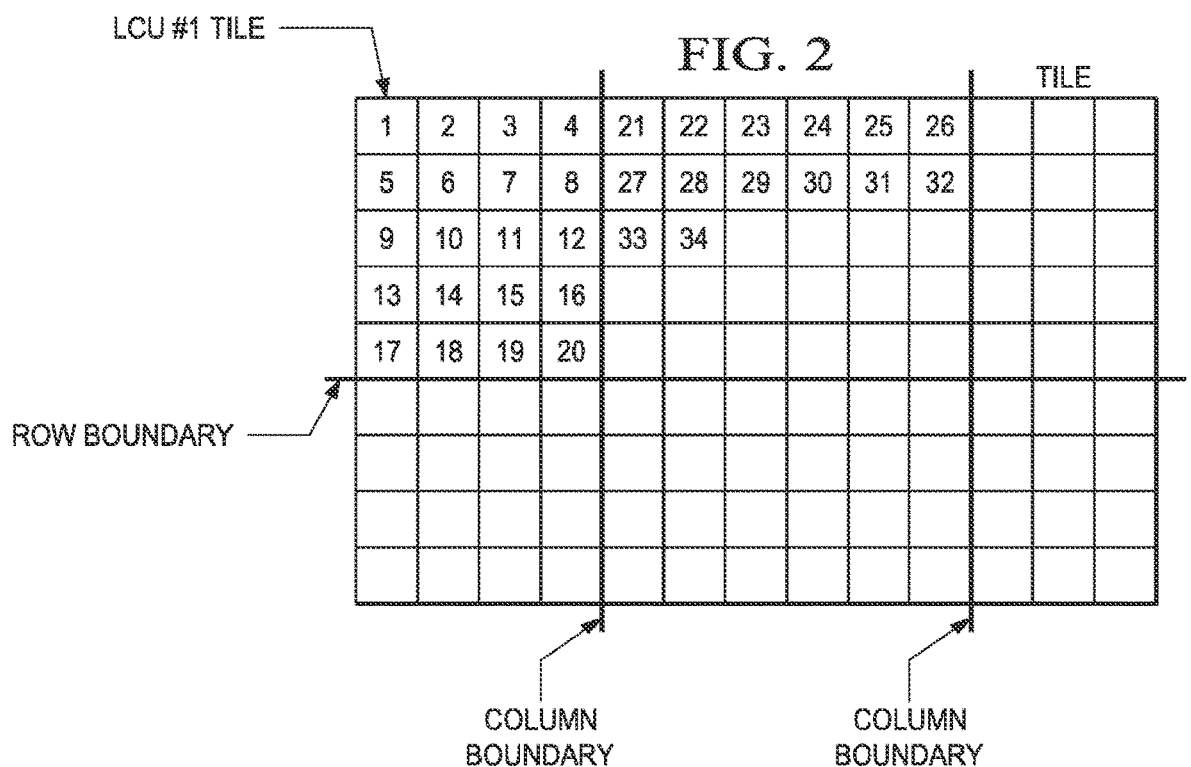
FIG. 2 is an example of dividing a picture into tiles.

As previously mentioned, HEVC includes some parallel processing tools to support parallel processing on a platform with multiple processing cores. In addition to slices as introduced in H.264/AVC, these tools include tiling, wavefront parallel processing (WPP), and entropy slices. Tiling allows the division of a picture horizontally and vertically into multiple rectangular partitions referred to as tiles. FIG. 2 shows an example of dividing a picture into tiles. In prior art versions of HEVC, e.g., WD5, tiles could be dependent, i.e., not break coding dependencies (e.g., the dependencies associated with intra-prediction, motion vector prediction, and parsing) or could be independent, i.e., coding dependencies not allowed across column and row boundaries in the same way as slices. Each tile contains an integer number of LCUs, i.e., tile boundaries are LCU-aligned.

Figure 3:
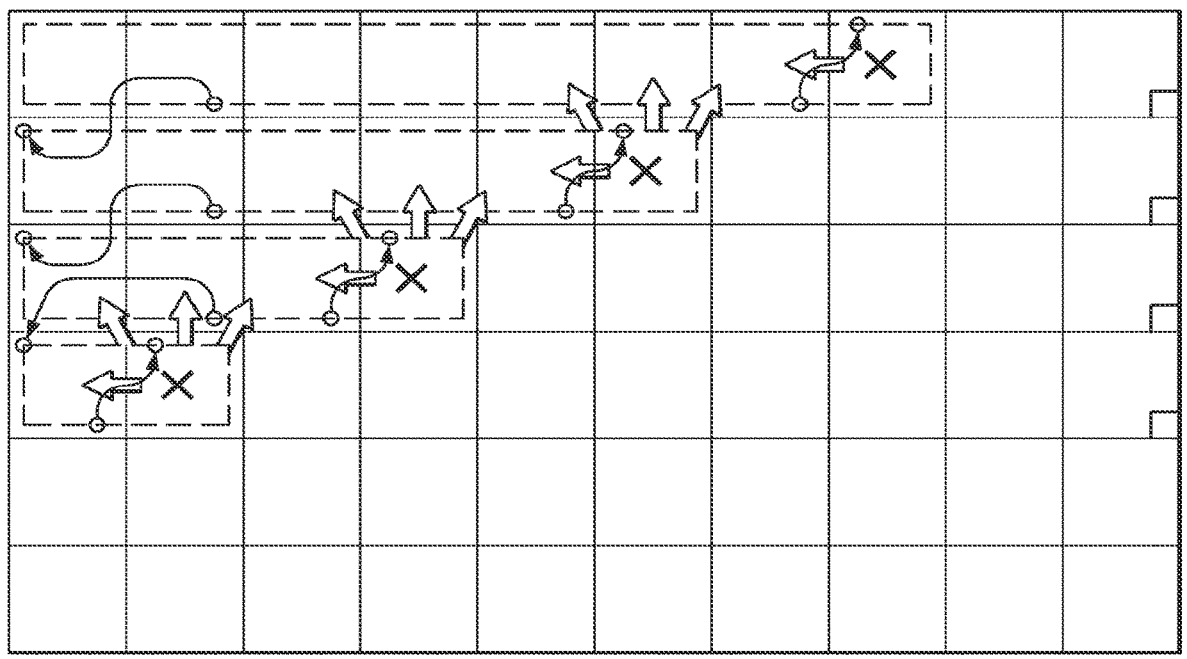
FIG. 3 is an example illustrating wavefront parallel processing of a picture.

Wavefront parallel processing enables multiple rows of LCUs in a picture to be processed in parallel. All dependencies are kept across LCUs. The top dependencies are satisfied as long as the LCU in the row above is processed ahead of the current row, i.e., the LCU to the top left of the current LCU is completed. FIG. 3 shows an example of processing four rows of LCUs in parallel.

Entropy slices allow for parallel entropy coding, meaning that there are no dependencies across entropy slices during entropy coding. However, dependencies are allowed across LCUs for other processing such as intra prediction, motion vector prediction, etc. LCUs are assigned to entropy slices in raster scan order (similar to the assignment used for slices).

Figure 4:
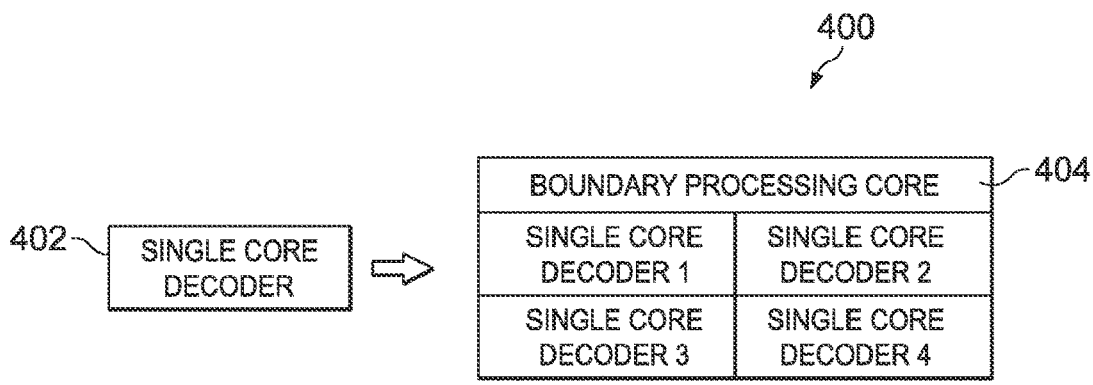
FIG. 4 an example illustrating replication of a single core decoder to form multi-core decoder.

For encoders and decoders implemented on a multiple core computing platform, replication of encoding or decoding processing on multiple cores is important for achieving high throughput. For example, as shown in the example of FIG. 4, a 4K×2Kp@60 decoder 400 may be constructed by replicating a 1080p@60 single core decoder 402 four times. Each of the four replicated cores includes functionality to perform all decoding processing except in-loop filtering along sub-picture boundaries. Accordingly, each of these cores may be used to decode distinct subsets of a picture in parallel. A fifth core 404 may be included for boundary processing to execute, for example, in-loop filters such as a de-blocking filter, a sample adaptive offset (SAO) filter, and an adaptive loop filter (ALF) along boundaries between the picture subsets.

On such a platform, to achieve high throughput, the allocation of LCUs to the replicated processing cores should be balanced such that the workload is distributed more or less equally among the replicated cores. Tiling, WPP, entropy slices, and slices do not guarantee pixel rate balancing across multiple replicated cores to achieve maximum throughput, i.e., these tools do not ensure that approximately equal numbers of LCUs in a picture are dispatched to each of the available replicated processing cores.

Embodiments of the invention provide for pixel rate balancing on multi-core processing platforms for video encoding and decoding. More specifically, certain constraints are imposed to enable high throughput in multi-core architectures such as that in the example of FIG. 4. To facilitate pixel rate balancing among multiple processing cores, a picture may be divided into sub-pictures that can be encoded and decoded independently. The number of sub-pictures into which a picture is to be divided is based on the pixel rate of the video sequence and picture size, and is mandated by the video coding standard in use, e.g., HEVC. That is, the coding standard specifies the number of sub-pictures to be used for a given pixel rate and picture size. For example, the number of sub-pictures for a given pixel rate and picture size may be specified in levels defined by the video coding standard.

The use of profiles and levels in a video coding standard is well known. In general, profiles and levels specify restrictions on bit streams and hence limits on the capabilities needed to decode the bit streams. Profiles and levels may also be used to indicate interoperability points between individual decoder implementations. In HEVC, a profile specifies a subset of algorithmic features that are to be supported by all decoders conforming to that profile and a level specifies a set of limits on the values that may be taken by syntax elements and other constraints such as the maximum number of tiles, the maximum number of slices per picture and per second, etc. Further, the same set of level definitions is used with all profiles, but individual decoder implementations may support a different level for each supported profile. For any given profile, levels generally correspond to decoder processing load and memory capabilities. Further, each level is associated with a maximum pixel rate, also referred to as a sample rate. As explained in more detail herein, the level definitions may be extended to include specifying a required number of sub-pictures for each level.

Each of the sub-pictures of a picture contains an integer of LCUs and the number of LCUs in each sub-picture is as close to equal as possible given the picture and LCU dimensions. As is explained in more detail herein, while it is desirable to divide a picture into equal sized sub-pictures, some picture dimensions and/or LCU dimensions may be such that equal distribution of LCUs to sub-pictures is not possible. The boundaries of a sub-picture are LCU-aligned.

That is, the boundaries of a sub-picture are also LCU boundaries. It is recognized that the dimensions of a picture and the dimensions of an LCU may not allow a picture to be evenly divided into LCUs. There may be blocks at the bottom of the picture or the right side of the picture that are smaller than the actual LCU size, i.e., partial LCUs. These partial LCUs are mostly treated as if they were full LCUs and are referred to as LCUs.

The particular sub-picture partitioning used by an encoder is signaled in the compressed bit stream. In some embodiments, the signaling is explicit. In some embodiments, the some or all of the signaling is implicit.

To minimize data communication between the processing cores, sub-pictures are independent, i.e., coding dependencies are not allowed across sub-picture column and row boundaries. However, in-loop filters such as a deblocking filter, a sample adaptive offset (SAO) filter, and an adaptive loop filter (ALF) may be applied across sub-picture boundaries. Further, coding constructs such as tiles, slices, entropy slices, and WPP may be used within sub-pictures but cannot cross sub-picture boundaries. In some embodiments, the sub-pictures of a picture are encoded in the compressed bit stream in sub-picture raster scan order. In some embodiments, encoded subsets of data, e.g., slices, from sub-pictures of a picture are inter-leaved in the compressed bit stream.

Figure 5:
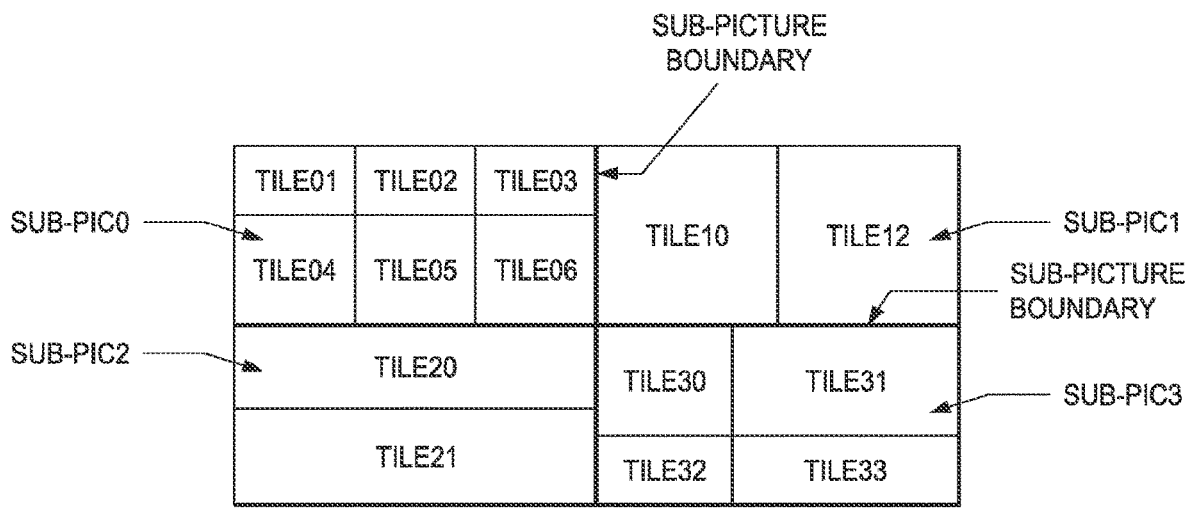
FIG. 5 is an example of a picture divided into sub-pictures and sub-pictures divided into tiles.

Each sub-picture is encoded according to the scan order(s) of the coding constructs used, e.g., LCUs, tiles of LCUs, slices of LCUs or tiles, entropy slices, and WPP. FIG. 5 shows an example of a picture divided into four sub-pictures in which each sub-picture is divided into tiles of differing sizes. Note that the tile boundaries are constrained by the sub-picture boundaries. In some embodiments, the encoding order of the sub-pictures in the bit stream is sub-picture raster scan order, i.e., sub-pic0, sub-pic1, sub-pic2, sub-pic3. Within a sub-picture, the encoding order of the tiles is the tile scanning order. For example, if the tile scanning order is raster scan order, then the tiles in sub-pic0 are encoded in the following order: tile01, tile02, tile03, tile04, tile05, tile06.

Figure 6:
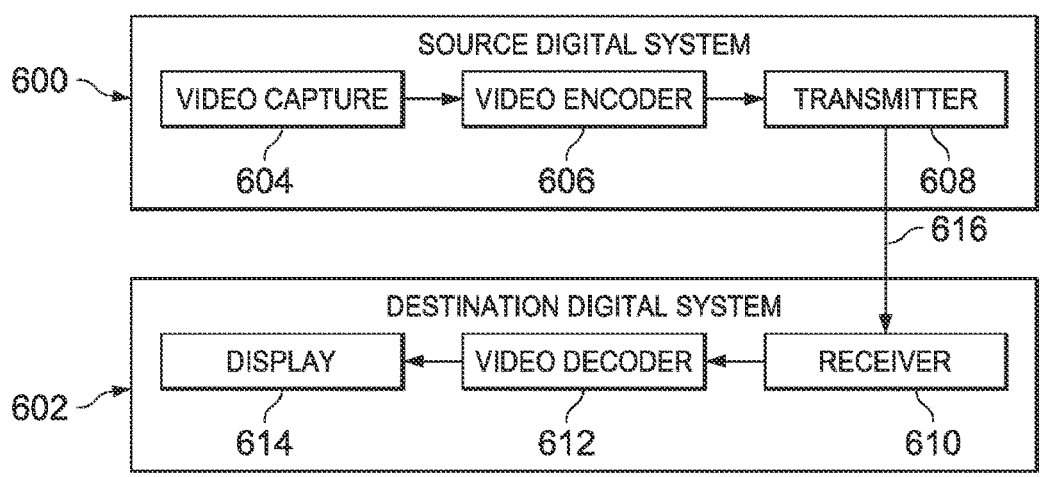
FIG. 6 is a block diagram of a digital system.

FIG. 6 shows a block diagram of a digital system that includes a source digital system 600 that transmits encoded video sequences to a destination digital system 602 via a communication channel 616. The source digital system 600 includes a video capture component 604, a video encoder component 606, and a transmitter component 608. The video capture component 604 is configured to provide a video sequence to be encoded by the video encoder component 606. The video capture component 604 may be, for example, a video camera, a video archive, or a video feed from a video content provider. In some embodiments, the video capture component 604 may generate computer graphics as the video sequence, or a combination of live video, archived video, and/or computer-generated video.

The video encoder component 606 receives a video sequence from the video capture component 604 and encodes it for transmission by the transmitter component 608. The video encoder component 606 receives the video sequence from the video capture component 604 as a sequence of pictures, divides the pictures into largest coding units (LCUs), and encodes the video data in the LCUs. The video encoder component 606 may be configured to perform an embodiment of pixel rate balancing as described herein during the encoding process. An embodiment of the video encoder component 606 is described in more detail herein in reference to FIG. 7.

The transmitter component 608 transmits the encoded video data to the destination digital system 602 via the communication channel 616. The communication channel 616 may be any communication medium, or combination of communication media suitable for transmission of the encoded video sequence, such as, for example, wired or wireless communication media, a local area network, or a wide area network.

The destination digital system 602 includes a receiver component 610, a video decoder component 612 and a display component 614. The receiver component 610 receives the encoded video data from the source digital system 600 via the communication channel 616 and provides the encoded video data to the video decoder component 612 for decoding. The video decoder component 612 reverses the encoding process performed by the video encoder component 606 to reconstruct the LCUs of the video sequence. The video decoder component 612 may be configured to perform an embodiment of pixel rate balancing as described herein during the decoding process. An embodiment of the video decoder component 612 is described in more detail below in reference to FIG. 14.

The reconstructed video sequence is displayed on the display component 614. The display component 614 may be any suitable display device such as, for example, a plasma display, a liquid crystal display (LCD), a light emitting diode (LED) display, etc.

In some embodiments, the source digital system 600 may also include a receiver component and a video decoder component and/or the destination digital system 602 may include a transmitter component and a video encoder component for transmission of video sequences both directions for video steaming, video broadcasting, and video telephony. Further, the video encoder component 606 and the video decoder component 612 may perform encoding and decoding in accordance with one or more video compression standards. The video encoder component 606 and the video decoder component 612 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 7:
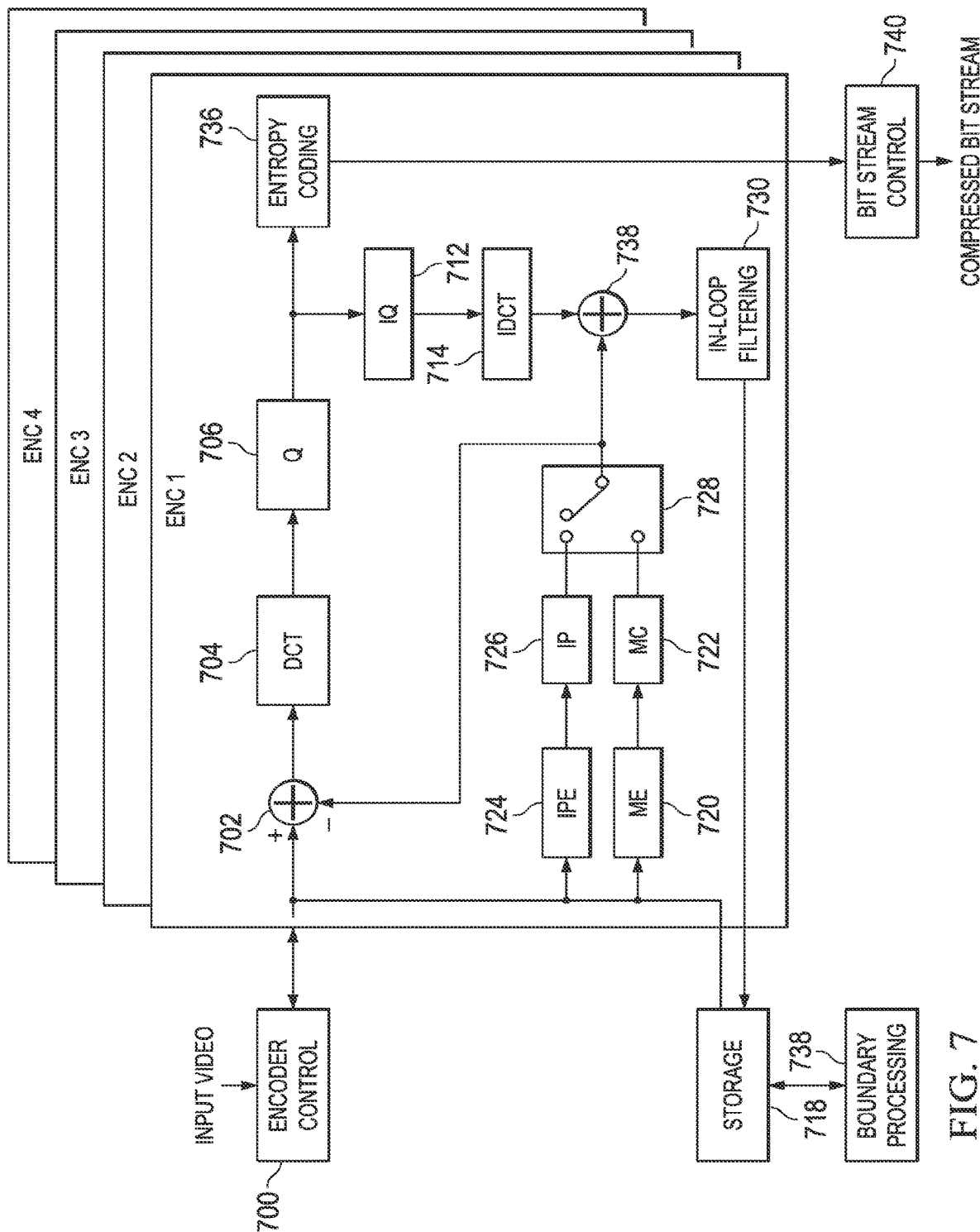
FIG. 7 is a block diagram of a multi-core video encoder.

FIG. 7 is a block diagram of an example multi-core video encoder. For simplicity of explanation, the video encoder includes four replicated encoder cores configured to encode sub-pictures and another core configured to perform sub-picture boundary processing such as in-loop filtering across sub-picture boundaries. As shown in FIG. 7, the multi-core video encoder includes an encoder control component 700, a storage component 718, a boundary processing component 738, a bit stream control component 740, and four encoder cores communicatively coupled to these components.

The encoder control component 700 receives the input digital video sequence and performs any processing on the input video sequence that is performed at the sequence or picture level such as determining the coding type (I, P, or B) of a picture based on the high level coding structure, e.g., IPPP, IBBP, hierarchical-B, and dividing the picture into sub-pictures. In general, the number of sub-pictures into which the encoder control component 700 divides each picture depends on the pixel rate and picture size of the incoming video stream. More specifically, the video coding standard in use mandates the number of sub-pictures to be used for a given pixel rate and picture size. Pixel rate, also referred to as sample rate, is the number of lines in a picture multiplied by the number of pixels in a line multiplied by the picture rate.

In some embodiments, the number of sub-pictures is defined by the particular profile and level being used to encode the video sequence. As previously mentioned, a level within a profile generally corresponds to the expected decoder processing load and memory capabilities and each level is associated with a particular maximum pixel rate and picture size. The level definitions may be extended to specify the number of sub-pictures for a given level. Further, the number of sub-pictures specified for a level may be based on the expected processing throughput of a single decoder core. FIGS. 8, 9, 10, and 11 show tables illustrating various examples of associating a number of sub-pictures with a level. The first seven columns of these tables are copied from a level table specified in HEVC Draft 6. This level table is used for example purposes only. The number of levels and the contents of a level table in a coding standard specifying sub-picture support as described herein may vary from this example.

In the tables of FIGS. 8 and 9, the number of sub-pictures is specified by specifying a required number of columns (num_subpic_cols) and a required number of rows (num_subpic_rows) of sub-pictures. For the table of FIG. 8, the number of sub-pictures for each level is specified based on assumptions that the pixel rate of a decoder core is 1080p@60 and a picture size is 1920×1080. 1080p denotes a set of high-definition video modes characterized by pictures with 1080 horizontal lines and progressive scan and the number 60 denotes the picture rate per second, i.e., 60 pictures per second. For the table of FIG. 9, the number of sub-pictures for each level is specified based on assumptions that the pixel rate of a decoder core is 4K×2K@30 and a picture size is 4K×2K. 4K×2K (also referred to as 4K, Ultra High Definition (HD), Quad High Definition, or 2160p) refers to one of two high definition resolutions: 3840×2160 pixels or 4096×2160 pixels. The number 30 denotes the picture rate per second, i.e., 30 pictures per second. These particular decoder core pixel rates and picture sizes are used for example purposes only.

The specification of num_subpic_cols and num_subpic_rows in the tables of FIGS. 8 and 9 enables building a multi-core encoder and/or decoder by replicating single-core encoders or decoders configured for lower pixel rates and picture sizes without increasing the line buffer size of a single core to support higher-resolution video encoding/decoding. For example, in the table of FIG. 8, which assumes a 1080p@60 single core decoder pixel rate, levels 5, 5.1 and 5.2 support 4K×2K video. For these levels, the required number of sup-picture columns, num_subpic_cols, is two, meaning that a 4K×2K picture is to be divided by a factor of 2 in the horizontal direction for sub-picture partitioning. This guarantees that a 1080p@60 single core with a 2K horizontal line buffer size can encode or decode the sub-pictures in real-time.

Alternatively, to permit more flexibility in sub-picture partitioning while still not requiring an increase in line buffer sizes of single core encoders or decoders, rather than specifying the required number of row and columns for each level, the required number of sub-pictures is specified and a minimum number of sub-picture columns (min_num_subpic_cols) is specified. The minimum number of sub-picture columns is specified such that the minimum division of a picture in the horizontal direction does not require an increase in the line buffer size for a single core encoder or decoder with the expected pixel rate and picture size. This ensures that the single core encoder or decoder can be replicated to support higher resolution video without increasing the line buffer size of a core. To facilitate pixel rate balancing on multi-core platforms, the total number of sub-pictures and the minimum number of sub-picture columns may be constrained to be power of two.

This approach to specifying sub-picture partitioning is more flexible than the previously described approach in that it allows different partitioning of a picture as long as the constraints of the minimum number of columns and the total number of sub-pictures are met. For example, if the total number of sub-pictures is defined to be four and min_num_subpic_cols is defined to be two, a picture can be divided into 2×2 or 4×1 sub-pictures. The 4×1 partitioning (i.e., 4 sub-picture columns and 1 sub-picture row) results in the lowest latency for coding on multiple cores.

Examples of specifying the number of sub-pictures and the minimum number of sub-picture columns for various levels are shown in the tables of FIGS. 10 and 11. For the table of FIG. 10, the number of sub-pictures and the minimum number of columns for each level is determined based on the assumption that the pixel rate and picture size of a decoder core are, respectively, 1080p@60 and 1920×1080. For the table of FIG. 11, the number of sub-pictures and the minimum number of columns for each level is determined based on the assumption that the pixel rate and picture size of a decoder core are, respectively, 4K×2K@30 and 4K×2K.

Referring again to FIG. 7, the encoder control component 700 divides a picture into the required number of sub-pictures such that each sub-picture includes as close as is possible to the same number of LCUs. Depending upon the particular picture size and the particular LCU size, it may not be possible to divide a picture into equal-sized sub-pictures. For example, if a picture is 7×5 LCUs and is to be divided into 2×2 sub-pictures, then equal sized sub-pictures are not possible. To meet 2×2 partitioning requirement, the picture may be divided as follows: the upper-left sub-picture size is 3×2 LCUs, the upper-right sub-picture size is 4×2 LCUs, the bottom left sub-picture size is 3×3 LCUs, and the bottom right sub-picture size is 4×3 LCUs.

For optimal multi-core parallel processing, it is desirable that a picture be divided into sub-pictures such that each core has balanced (as close to equal as possible) loading. Further, having the sizes of the sub-pictures be as close to equal as possible minimizes hardware implementation cost as each replicated core is designed for real-time encoding/decoding of a sub-picture of the largest size. Therefore, minimization of the largest sub-picture size when dividing a picture into sub-pictures is important for reducing the overall hardware implementation cost of a multi-core codec. Accordingly, the encoder control component 700 divides a picture into the required number of sub-pictures such that the size difference between the largest sub-picture and the smallest sub-picture is minimized.

Consider the following example. For a 1080p video sequences (1920×1080 picture size), if the LCU size is 64×64, the picture size is 30×17 LCUs. If the picture is divided into 4×2 sub-pictures, (i.e., number of sub-picture columns is 4 and number of sub-picture rows is 2), the sub-pictures will be of different sizes because 30 is not multiple of 4 and 17 is not a multiple of 2. An optimal way to minimize the sub-picture size is to decompose the horizontal picture size 30 into 7+7+8+8 and the vertical picture size 17 into 8+9. With these decompositions, the largest sub-picture has 8×9 LCUs and the smallest sub-picture has 7×8 LCUs. Alternatively, the horizontal picture size 30 can be divided into 7+7+7+9, but this kind of partitioning is less desirable because it results in the largest sub-picture being 9×9 LCUs, which would increase implementation cost as each core would need to be able to process sub-pictures of size 9×9 LCUs instead of 8×9 LCUs in real-time.

In the partitioning of a picture into sub-pictures, the size difference between the largest sub-picture and the smallest sub-picture may be minimized as follows. The basic idea is to limit the sub-picture size difference between the largest sub-picture and the smallest sub-picture to be less than or equal to one LCU in both the horizontal and vertical directions. Let picture size be W*H (in LCUs) where W is the picture width and H is the picture height and let n*m be the number of sub-pictures where n is the number of columns and m is the number of rows. The values of W and H may be defined as per $$\begin{cases} W = (n-k)^*x + k^*(x+1) = n^*x + k \\ H = (m-j)^*y + j^*(y+1) = m^*y + j \end{cases}$$

where x*y is smallest sub-picture size, and (x+1)*(y+1) is the largest sub-picture size. In the horizontal direction, k columns of sub-pictures will have a size of (x+1) and (n−k) columns of sub-pictures will have a size of x; similarly, in the vertical direction, j rows of sub-pictures will have a size of (y+1) and (m−j) rows of sub-pictures will have a size of y. The values of x, y, k and j are all integers and are in units of LCUs. These values may be determined as per $$\begin{cases} x = W/n \\ k = W\%n \\ y = H/m \\ j = H\%m \end{cases}.$$

For example, for W*H=30×17 and n*m=4×2, the values of x, y, k and j are $$\begin{cases} x = 30/4 = 7 \\ k = 30\%4 = 2 \\ y = 17/2 = 8 \\ j = 17\%2 = 1 \end{cases}.$$

Figure 21:
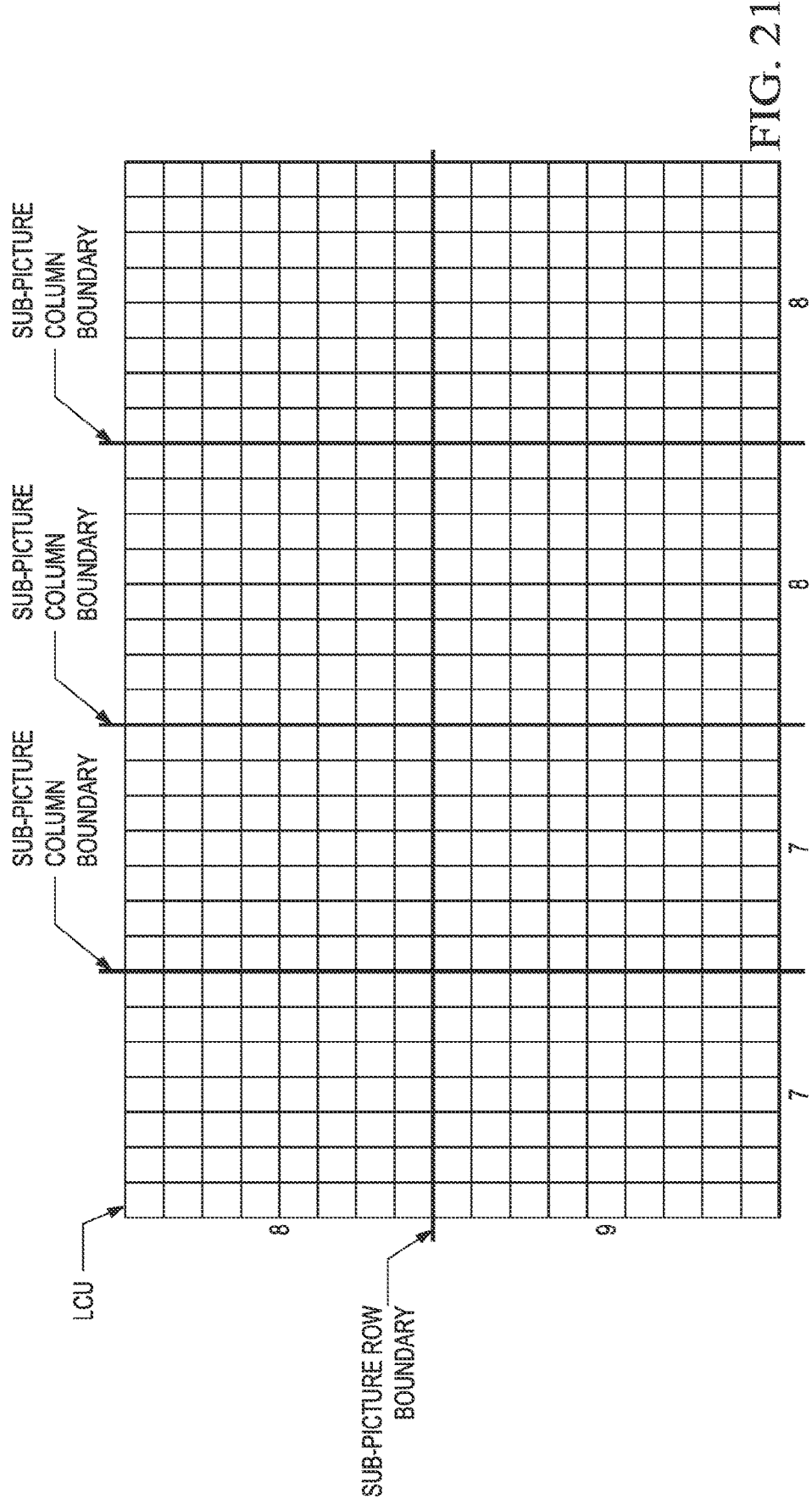
FIGS. 21 and 22 are examples of sub-picture partitioning.

Continuing the example of a 1080p video sequences (1920×1080 picture size) with a picture size of 30×17 LCUs, using the above formulation, W=30 is decomposed into 30=7+7+8+8, and H=17 is decomposed into 17=8+9, which is the optimal sub-picture partitioning discussed above. FIG. 21 is an example illustrating this sub-picture partitioning.

Figure 22:
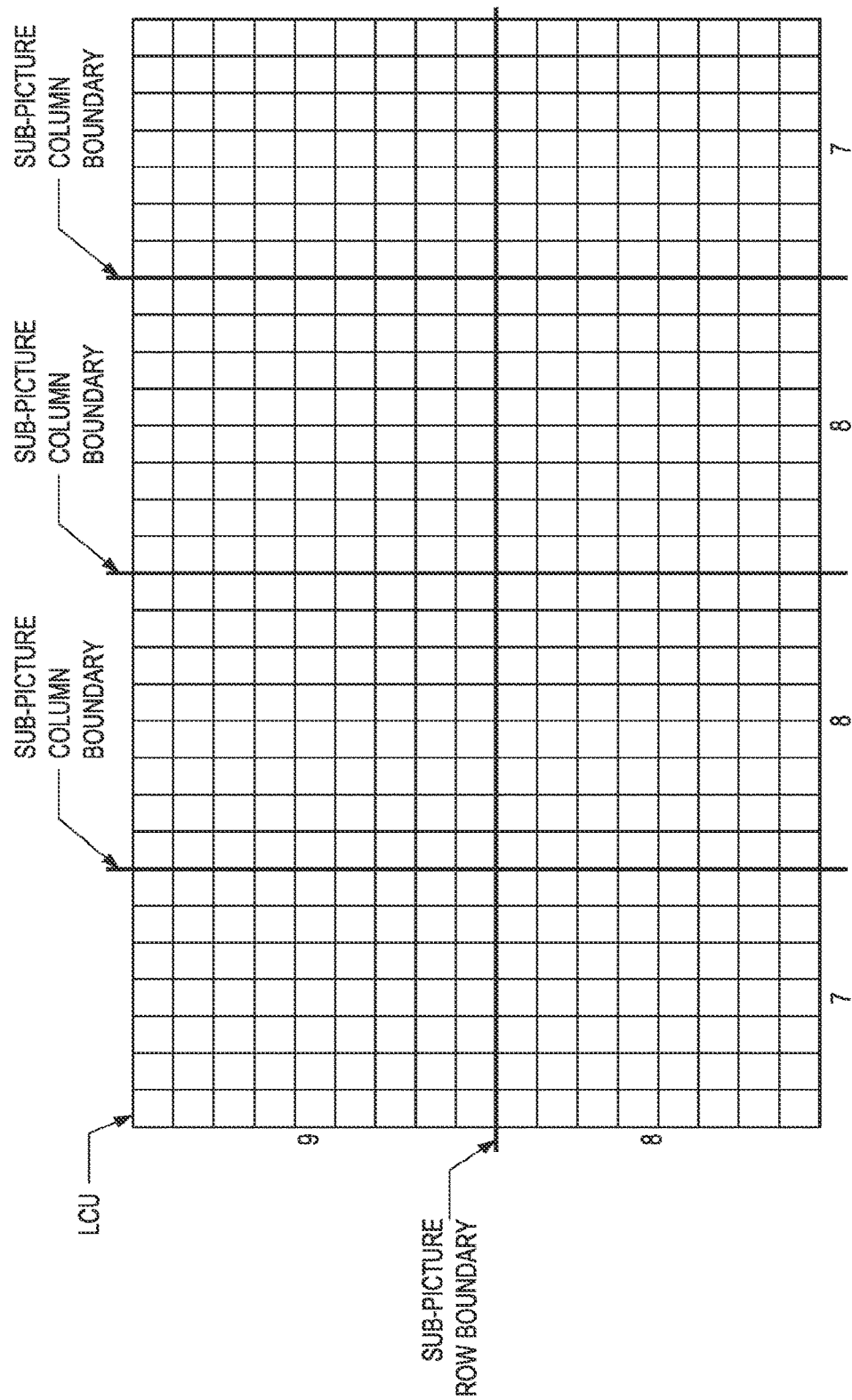

Note that the above partitioning technique merely limits the sub-picture size difference between the largest sub-picture and smallest sub-picture to be less than or equal to one LCU in each direction, and specifies a way to compute the sub-picture sizes. This partitioning technique does not impose any constraints on the sub-picture partitioning order. FIG. 22 is an example illustrating another sub-picture partitioning order different from that of FIG. 21 that is also optimal. That is, once the sizes and numbers of sub-pictures are determined using the above technique, the encoder control component 700 may divide a picture into sub-pictures of the appropriate sizes and numbers in any suitable order.

The encoder control component 700 also causes the particular sub-picture partitioning used to be signaled in the compressed bit stream. Any suitable signaling protocol may be used. As is well known, the particular signaling protocol to be used is typically defined by the video coding standard in use. In some embodiments, the encoder control component 700 uses an implicit signaling protocol that utilizes a tile signaling protocol with some constraints. Table 1 shows the tile syntax elements that may be included in an SPS or PPS as defined in HEVC Draft 6. This particular tile syntax element specification is provided for example purposes only.

In Table 1, (num_tile_columns_minus1+1) specifies the number of tiles of a picture in the horizontal direction, uniform_spacing_flag controls whether or not tiles are evenly divided in both the vertical and horizontal directions, column_width[i], i=0, 1, . . . num_tile_columns_minus1, specifies the horizontal tile spacing for each column of tiles in units of LCUs, and row_height[i], i=0, 1, . . . num_tile_rows_minus1, specifies the vertical tile spacing of each row in units of LCUs. Note that column_width[num_tile_columns_minus1] and row_height[num_tile_rows_minus1] do not need to be signaled in the bit stream as these values can be determined from the signaled picture size and the other tile spacing sizes.

TABLE 1

```
if( tiles_or_entropy_coding_sync_idc = = 1 ) {
    num_tile_columns_minus1
    num_tile_rows_minus1
    uniform_spacing_flag
    if( !uniform_spacing_flag ) {
        for( i = 0; i < num_tile_columns_minus1; i++ )
            column_width[ i ]
        for( i = 0; i < num_tile_rows_minus1; i++ )
            row_height[ i ]
    }
    loop_filter_across_tiles_enabled_flag
}
```

In order to use the tile syntax to signal sub-picture partitions, the following constraints are imposed. Tiles are required to evenly divided, i.e., uniformly spaced, in the vertical direction. That is, if a picture is evenly divided into num_subpic_cols×num_subpic_rows sub-pictures, then num_tile_rows_minus1 is constrained to be equal to num_subpic_rows−1. This constraint is important for guaranteeing pixel rate balancing when tiles are processed in raster-scan order within a picture. In the horizontal direction, tiles can be either uniformly or non-uniformly spaced, i.e., num_tile_columns_minus1 can be greater than or equal to num_subpic_cols−1 as long as there are num_subpic_cols−1 right tile column boundaries coincident with the vertical sub-picture boundaries. In addition, num_subpic_cols and num_sub_pic_rows should be specified for profile levels, e.g., the tables of FIGS. 8 and 9.

In some embodiments, to allow control of the tile spacing in the vertical and horizontal directions separately, the uniform_spacing_flag is split into two flags, uniform_column_spacing_flag and uniform_row_spacing_flag. The modified tile syntax element specification for an SPS or PPS assuming the tile syntax element specification of Table 1 is shown in Table 2.

TABLE 2

```
if( tiles_or_entropy_coding_sync_idc = = 1 ) {
    num_tile_columns_minus1
    num_tile_rows_minus1
    uniform_column_spacing_flag
    uniform_row_spacing_flag
    if( !uniform_column_spacing_flag ) {
        for( I = 0; I < num_tile_columns_minus1; i++ )
            column_width[ I ]
    }
```

TABLE 2-continued

```
    if (!uniform_row_spacing_flag) {
        for( i = 0; i < num_tile_rows_minus1; i++ )
            row_height[ i ]
    }
    loop_filter_across_tiles_enabled_flag
}
```

In some embodiments, the one bit flag for indicating uniform tile spacing, i.e., uniform_spacing_flag, is replaced by a multi-bit indicator, i.e., uniform_spacing_idc, with the semantics of Table 3.

TABLE 3

| uniform_spacing_idc | Semantics |
|---|---|
| 0 | Non-uniform tile spacing in both vertical and horizontal directions |
| 1 | Uniform tile spacing in horizontal direction, non-uniform tile spacing in vertical direction |
| 2 | Non-uniform tile spacing in horizontal direction, uniform tile spacing in vertical direction |
| 3 | Uniform tile spacing in both horizontal and vertical directions |

Figure 12:
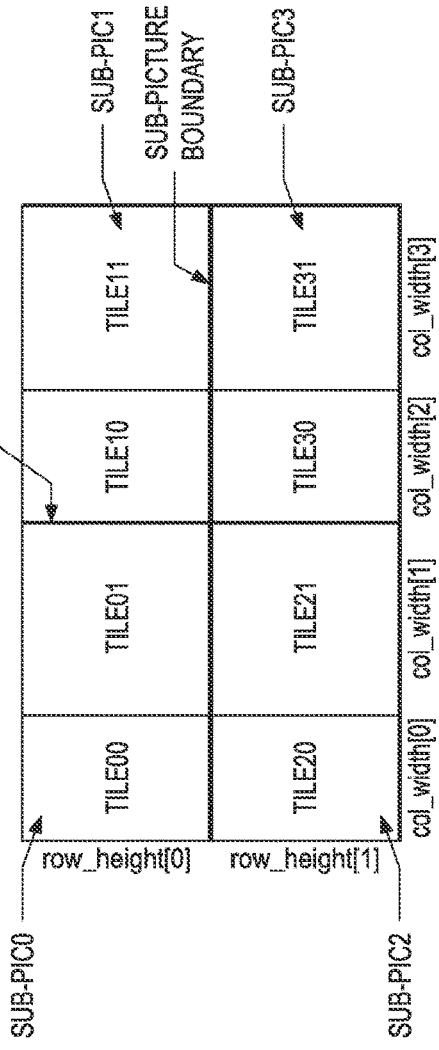
FIG. 12 is an example illustrating even sub-picture partitioning with an uneven division of tiles in the horizontal direction.

FIG. 12 shows an example of even sub-picture partitions, i.e., 2×2 sub-pictures, with an uneven division of tiles in the horizontal direction. Note that this corresponds to level 5.2 in the table of FIG. 8 and to level 6 in the table of FIG. 9. In this example, the picture is evenly divided into tiles by factor of two in the vertical direction. In the horizontal direction, the picture is unevenly divided into four tiles. Note that there is one right-hand tile column boundary that is coincident with the sub-picture boundary, i.e., the right-hand column boundary of Tile01 and Tile21. The tile syntax elements of Table 2 may be used to implicitly signal this sub-picture partitioning given that the number of sub-picture rows and columns are specified for the level being used for encoding, e.g., the tables of FIGS. 8 and 9.

Referring again to FIG. 7, in embodiments using the more flexible sub-picture specification in which sub-picture partitioning is specified by a number of sub-pictures and a minimum number of sub-picture columns, the encoder control component 700 may also use the implicit sub-picture signaling using the constrained tile signaling protocol. Note that the number of tile rows signaled using this protocol is constrained to the number of sub-picture rows, num_subpic_rows. In addition, the encoder control component 700 may cause the explicit signaling of the number of sub-picture columns, num_subpic_cols, e.g., in a PPS. Alternatively, the number of sub-picture columns may be derived from the number of sub-pictures specified for the level in use and the number of tile rows.

In some such embodiments, rather than using the tile signaling protocol, the encoder control component 700 may cause the explicit signaling of the number of sub-picture columns, num_subpic_cols, in the compressed bit stream, e.g., in the SPS or a PPS. In addition, the encoder control component 700 may cause the explicit signaling of the number of sub-picture rows, num_subpic_rows. Alternatively, the number of sub-picture rows may be derived based on the number of sub-pictures specified for the level in use and the signaled number of sub-picture columns.

The encoder control component 700 also allocates the sub-pictures to the encoder cores for encoding. If the picture is divided into four sub-pictures (as mandated by the coding standard for the particular pixel rate and picture size), and if the four encoder cores are each capable of encoding a sub-picture at the particular pixel rate and picture size needed for real-time encoding, then the encoder control component 700 dispatches one sub-picture to each encoder core to be encoded in parallel. If the replicated encoder cores are capable of encoding larger sub-pictures with higher pixel rates and picture sizes, then the encoder control component 700 may dispatch multiple sub-pictures sequentially to one encoder core. For example, if a picture is divided into eight sub-pictures (as mandated by the coding standard for the particular pixel rate and picture size), and if the four encoder cores are each capable of encoding two sub-pictures at the particular pixel rate and picture size needed for real-time encoding, then the encoder control component 700 dispatches two sub-pictures to each core. The four encoder cores encode the sub-pictures received in parallel but within each core, the two sub-pictures are processed sequentially.

If the replicated encoder cores are not capable of encoding a sub-picture at the particular pixel rate and picture needed for real-time encoding, e.g., an encoder core is only capable of encoding one half of a sub-picture in real-time, then the encoder control component 700 further divides a sub-picture into smaller partitions such as tiles and dispatches the tiles to the encoder cores. For example, If the picture is divided into two sub-pictures (as mandated by the coding standard for the particular pixel rate and picture size), and the four encoder cores are each capable of processing 0.5 sub-pictures in real-time, the encoder control component 700 further divides each of the two sub-pictures into two approximately equal sized tiles, and dispatches one tile (i.e., one half of a sub-picture in this example) to each encoder core for parallel processing.

The bit stream control component 740 receives the encoded sub-pictures from the sub-picture encoders and outputs them into the compressed bit stream. Further, the bit stream control component 740 include functionality to entropy encode data to be transmitted at the picture level and sequence level, e.g., sequence parameter sets (SPS), picture parameter sets (PPS), adaptation parameter sets (APS), in-loop filter parameters, etc. In some embodiments, the bit stream control component 740 outputs the sub-pictures of a picture in sub-picture raster scan order. In such embodiments, the bit stream control component 740 signals the entry point in the compressed bit stream of each sub-picture so that a decoder can locate the sub-pictures in the bit stream without need to parse an entire picture. These entry points may be signaled in any suitable way. For example, the entry points may be signaled in an APS. Table 4 shows an example syntax element specification for signaling sub-picture entry points in an APS.

The semantics of these example syntax elements for sub-picture entry signaling may be defined as follows. If aps_sub_pic_entry_present_flag is equal to one, then sub-picture entry information is present in the APS. If the number of sub-pictures specified by the profile and level definition for a certain profile and level is one, the value of aps_sub_pic_entry_present_flag is set to zero; otherwise it is set to one. The value of num_sub_pic_entry_point_offsets specifies the number of sub_pic_entry_point_offset[i] syntax elements present in the APS. The value of num_sub_pic_entry_point_offsets is set to the number of sub-pictures mandated by the profile and level definition. When not present, the value of num_sub_pic_entry_point_offsets is inferred to be zero. The value of sub_pic_entry_point_offset[i] specifies the ith entry point offset, in bytes, relative to the (i−1)th sub-picture entry point. The 0th offset specifies the absolute distance, in bytes, between the start of the APS and the start location of the first sub-picture in the compressed bit stream.

TABLE 4

```
aps_rbsp( ) {
    aps_id
    aps_sub_pic_entry_present_flag
    if (aps_tile_entry_present_flag) {
        num_sub_pic_entry_point_offsets
        if(num_sub_pic_entry_point_offsets > 0 ) {
            for( i = 0; i < num_sub_pic_entry_point_offsets; i++ )
                sub_pic_entry_point_offset[ i ]
        }
    }
    aps_scaling_list_data_present_flag
    ... ...
```

Figure 13:
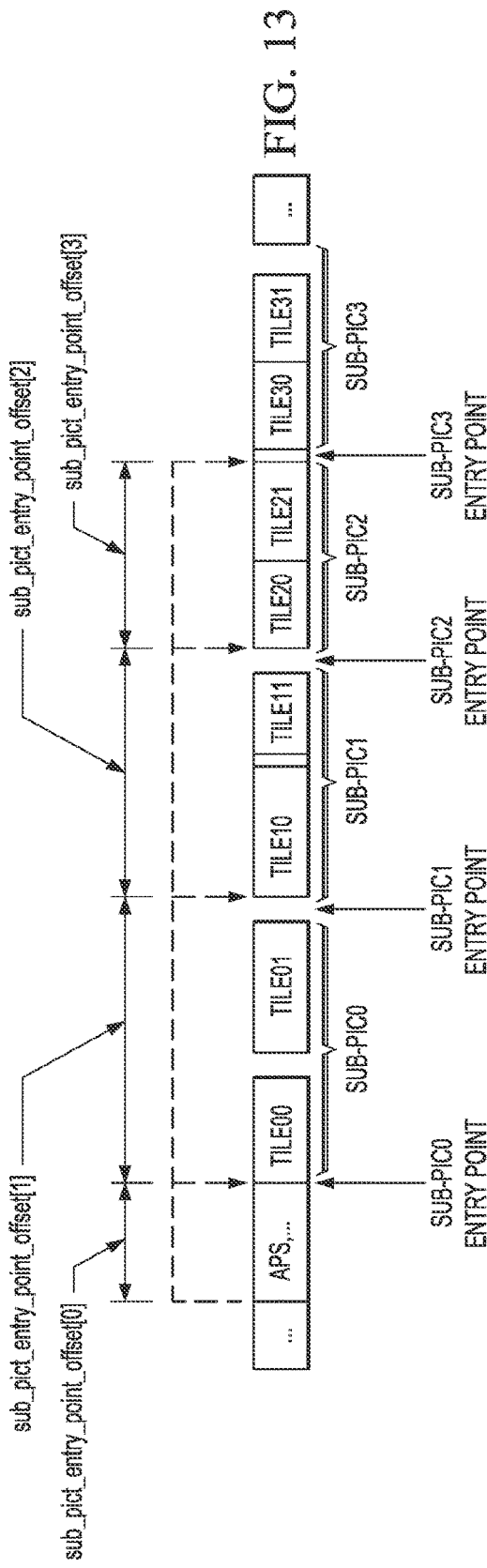
FIG. 13 is an example of sub-picture entry signaling in a compressed bit stream.

FIG. 13 shows an example of sub-picture entry signaling in a compressed bit stream assuming the sub-picture partitioning of FIG. 12 and assuming that the sub-picture entries are signaled in an APS. In this example, a picture is divided into four sub-pictures of equal size. Thus, the aps_sub_pic_entry_present_flag is set to one, the num_sub_pic_entry_point_offsets is set to four, the value of sub_pic_entry_point_offset[0] is set to the bit stream size from the start location of the APS to the start location of sub-pic0, the value of sub_pic_entry_point_offset[1] is set to the bit stream size of sub-pic0, the value of sub_pic_entry_point_offset[2] is set to the size of sub-pic1, and the value of sub_pic_entry_point_offset[3] is set to the size of sub-pic2.

The sub-picture encoders ENC1, ENC2, ENC3, and ENC4 include identical functionality for encoding sub-pictures. The LCU processing portion of these sub-picture encoders is depicted in FIG. 7. A coding control component (not shown) sequences the various operations of the LCU processing, i.e., the coding control component runs the main control loop for the sub-picture encoding. The coding control component receives a sub-picture and performs any processing that is to be done at the sub-picture level, such as dividing the sub-picture into LCUs for further processing.

The LCU processing receives LCUs of a sub-picture from the coding control component and encodes the LCUs under the control of the coding control component to generate the compressed sub-picture. The LCUs 700 in a sub-picture are processed in row order. The LCUs from the coding control component are provided as one input of a motion estimation component (ME) 720, as one input of an intra-prediction estimation component (IPE) 724, and to a positive input of a combiner 702 (e.g., adder or subtractor or the like). Further, although not specifically shown, the prediction mode of each picture as selected by the encoder control component 700 is provided to a mode decision component 728 and the entropy coding component 736.

The storage component 718 provides reference data to the motion estimation component 720 and to the motion compensation component 722 (of all the sub-picture encoders). The reference data may include one or more previously encoded and decoded pictures, i.e., reference pictures.

The motion estimation component 720 provides motion data information to the motion compensation component 722 and the entropy coding component 736. More specifically, the motion estimation component 720 performs tests on CUs in an LCU based on multiple inter-prediction modes (e.g., skip mode, merge mode, and normal or direct inter-prediction), partitioning modes (i.e., PU sizes), and TU sizes using reference picture data from storage 718 to choose the best CU partitioning, PU/TU partitioning, inter-prediction modes, motion vectors, etc. based on coding cost, e.g., a rate distortion coding cost. To perform the tests, the motion estimation component 720 may divide an LCU into CUs according to the maximum hierarchical depth of the quadtree, and divide each CU into PUs according to the unit sizes of various partitioning modes and into TUs according to the transform unit sizes, and calculate the coding costs for each PU size, prediction mode, and transform unit size for each CU. The motion estimation component 720 provides the motion vector (MV) or vectors and the prediction mode for each PU in the selected CU partitioning to the motion compensation component (MC) 722.

The motion compensation component 722 receives the selected inter-prediction mode and mode-related information from the motion estimation component 720 and generates the inter-predicted CUs. The inter-predicted CUs are provided to the mode decision component 728 along with the selected inter-prediction modes for the inter-predicted PUs and corresponding TU sizes for the selected CU/PU/TU partitioning. The coding costs of the inter-predicted CUs are also provided to the mode decision component 728.

The intra-prediction estimation component 724 (IPE) performs intra-prediction estimation in which tests on CUs in an LCU based on multiple intra-prediction modes, partitioning modes (i.e., PU sizes), and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 724 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 724 provides the selected intra-prediction modes for the PUs, and the corresponding TU sizes for the selected CU partitioning to the intra-prediction component (IP) 726. The coding costs of the intra-predicted CUs are also provided to the intra-prediction component 726.

The intra-prediction component 726 (IP) receives intra-prediction information, e.g., the selected mode or modes for the PU(s), the PU size, etc., from the intra-prediction estimation component 724 and generates the intra-predicted CUs. The intra-predicted CUs are provided to the mode decision component 728 along with the selected intra-prediction modes for the intra-predicted PUs and corresponding TU sizes for the selected CU/PU/TU partitioning. The coding costs of the intra-predicted CUs are also provided to the mode decision component 728.

The mode decision component 728 selects between intra-prediction of a CU and inter-prediction of a CU based on the intra-prediction coding cost of the CU from the intra-prediction component 726, the inter-prediction coding cost of the CU from the motion compensation component 722, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 736.

The output of the mode decision component 728, i.e., the predicted PUs, is provided to a negative input of the combiner 702 and to the combiner 738. The associated transform unit size is also provided to the transform component 704. The combiner 702 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 704 performs block transforms on the residual CUs to convert the residual pixel values to transform coefficients and provides the transform coefficients to a quantize component 706. More specifically, the transform component 704 receives the transform unit sizes for the residual CU and applies transforms of the specified sizes to the CU to generate transform coefficients. Further, the quantize component 706 quantizes the transform coefficients based on quantization parameters (QPs) and quantization matrices provided by the coding control component and the transform sizes and provides the quantized transform coefficients to the entropy coding component 736 for coding in the bit stream.

The entropy coding component 736 entropy encodes the relevant data, i.e., syntax elements, output by the various encoding components and the coding control component using context-adaptive binary arithmetic coding (CABAC) to generate the compressed sub-picture. Among the syntax elements that are encoded are picture parameter sets, flags indicating the CU/PU/TU partitioning of an LCU, the prediction and partitioning modes for the CUs, and the quantized transform coefficients for the CUs. The compressed sub-picture is provided to the bit stream control 740 to be output in the compressed bit stream.

The LCU processing component includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 712, which outputs a reconstructed version of the transform result from the transform component 704. The dequantized transform coefficients are provided to the inverse transform component (IDCT) 714, which outputs estimated residual information representing a reconstructed version of a residual CU. The inverse transform component 714 receives the transform unit size used to generate the transform coefficients and applies inverse transform(s) of the specified size to the transform coefficients to reconstruct the residual values. The reconstructed residual CU is provided to the combiner 738.

The combiner 738 adds the original predicted CU to the residual CU to generate a reconstructed CU, which becomes part of reconstructed picture data. The reconstructed picture data is stored in a buffer (not shown) for use by the intra-prediction estimation component 724.

The in-loop filtering component 730 applies various in-loop filters to the reconstructed picture data to improve the quality of the reference picture data used for encoding/decoding of subsequent pictures. The in-loop filters may include, for example, a deblocking filter, a sample adaptive offset filter (SAO), and an adaptive loop filter (ALF). The in-loop filters 730, 732, 734 are applied to each reconstructed LCU in the sub-picture and the final filtered reference picture data is provided to the storage component 718. In some embodiments, ALF filter may not be present.

The boundary processing component 738 applies the in-loop filtering to the sub-picture boundaries after the sub-pictures for a picture are decoded by the sub-picture encoders and stored in the storage 718. More specifically, the boundary processing component 738 reads the decoded picture data for blocks along the sub-picture boundaries and applies the in-loop filters (the same filters applied by the in-loop filtering component 730) across the boundaries. To enable this boundary filtering, information regarding boundary blocks, i.e., blocks on either side of sub-picture boundaries, such as motion data (motion vectors, reference picture indices, etc.), whether blocks are intra-coded or inter-coded, and CU/PU/TU partitioning and flags indicating whether or not TUs contain non-zero coefficients, is stored in the storage 718 by each of the sub-picture encoders.

Figure 14:
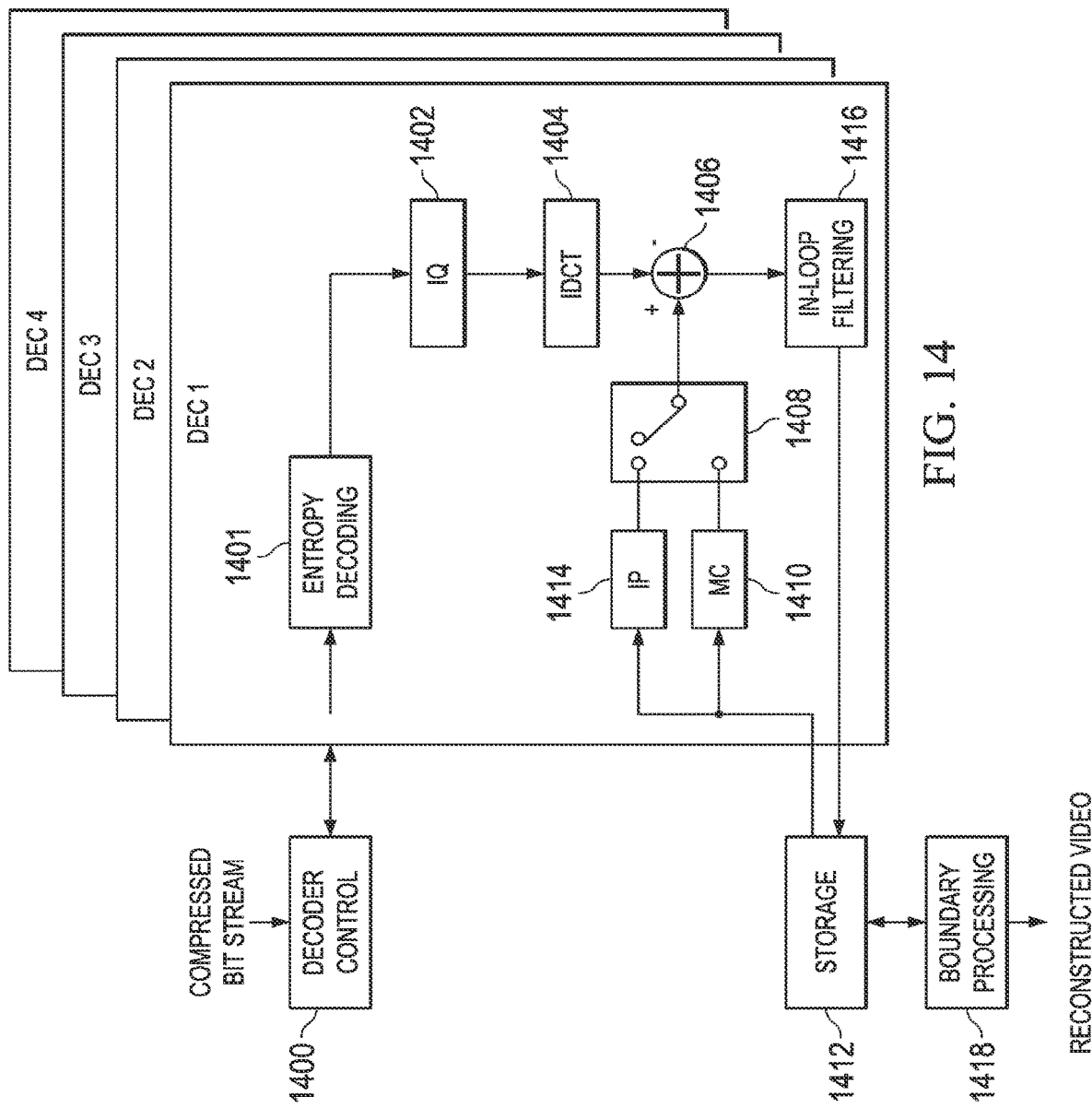
FIG. 14 is a block diagram of a multi-core video decoder.

FIG. 14 is a block diagram of an example multi-core video decoder. For simplicity of explanation, the video decoder includes four replicated decoder cores configured to decode sub-pictures and another core configured to perform boundary processing. One of ordinary skill in the art will understand embodiments with more or fewer decoder cores. As shown in FIG. 14, the multi-core video decoder includes a decoder control component 1400, a storage component 1412, a boundary processing component 1418, and four decoder cores communicatively coupled to these components.

The decoder control component 1400 receives the input compressed bit stream and performs any processing on the compressed bit stream needed at the sequence or picture level. More specifically, the decoder control component 1400 includes functionality to entropy decode portions of the bit stream encoding syntax elements at the picture and sequence levels, e.g., the SPS, PPSs, and APSs. In some embodiments, for each picture, the decoder control component 1400 locates the entry points of sub-pictures of the picture in the bit stream, and allocates the portions of the bit stream corresponding to those sub-pictures, i.e., sub-picture bit streams, to the sub-picture decoders for parallel decoding. These entry points may be signaled in any suitable way in the bit stream. For example, as previously described, the entry points for a picture may be signaled in an APS. The decoder control component 1400 may also determine the number of rows and columns of sub-pictures and the relative location of each sub-picture within a picture from information encoded in the bit stream. Various embodiments of signaling such information by an encoder are previously described herein. One of ordinary skill in the art will understand corresponding decoder embodiments without need for detailed description.

The decoder control component 1400 allocates the decoding of sub-pictures to decoder cores in a similar fashion to the previously described encoder allocation of sub-pictures to encoder cores. If the encoded picture is divided into four sub-pictures, and if the four decoder cores are each capable of decoding a sub-picture at the particular pixel rate and picture size needed for real-time decoding, then the decoder control component 1400 directs one sub-picture bit stream to each decoder core to be decoded in parallel. If the replicated decoder cores are capable of decoding larger sub-pictures with higher pixel rates and picture sizes, then the decoder control component 1400 may dispatch multiple sub-pictures bit streams sequentially to one decoder core. For example, if a picture is divided into eight sub-pictures, and if the four decoder cores are each capable of decoding two sub-pictures at the particular pixel rate and picture size needed for real-time decoding, then the decoder control component 1400 dispatches two sub-pictures to each core. The four decoder cores decode the sub-picture bit streams received in parallel but within each core, the two sub-picture bit streams are processed sequentially.

The sub-picture decoders DEC1, DEC2, DEC3, and DEC4 include identical functionality for decoding sub-pictures. The entropy decoding component 1401 receives an entropy encoded sub-picture bit stream and reverses the entropy encoding using CABAC decoding to recover the encoded syntax elements, e.g., CU, PU, and TU structures of LCUs, quantized transform coefficients for CUs, motion vectors, prediction modes, etc. The decoded syntax elements are passed to the various components of the sub-picture decoder as needed. For example, decoded prediction modes are provided to the intra-prediction component (IP) 1414 or motion compensation component (MC) 1410. If the decoded prediction mode is an inter-prediction mode, the entropy decoder 1401 reconstructs the motion vector(s) as needed and provides the motion vector(s) to the motion compensation component 1410.

The inverse quantize component (IQ) 1402 de-quantizes the quantized transform coefficients of the CUs. The inverse transform component 1404 transforms the frequency domain data from the inverse quantize component 1402 back to the residual CUs. That is, the inverse transform component 1404 applies an inverse unit transform, i.e., the inverse of the unit transform used for encoding, to the de-quantized residual coefficients to produce reconstructed residual values of the CUs.

A residual CU supplies one input of the addition component 1406. The other input of the addition component 1406 comes from the mode switch 1408. When an inter-prediction mode is signaled in the encoded video stream, the mode switch 1408 selects predicted PUs from the motion compensation component 1410 and when an intra-prediction mode is signaled, the mode switch selects predicted PUs from the intra-prediction component 1414.

The motion compensation component 1410 receives reference data from the storage component 1412 and applies the motion compensation computed by the encoder and transmitted in the encoded video bit stream to the reference data to generate a predicted PU. That is, the motion compensation component 1410 uses the motion vector(s) from the entropy decoder 1400 and the reference data to generate a predicted PU.

The intra-prediction component 1414 receives reconstructed samples from previously reconstructed PUs of a current picture from the storage component 1412 and performs the intra-prediction computed by the encoder as signaled by an intra-prediction mode transmitted in the encoded video bit stream using the reconstructed samples as needed to generate a predicted PU.

The addition component 1406 generates a reconstructed CU by adding the predicted PUs selected by the mode switch 1408 and the residual CU. The output of the addition component 1406, i.e., the reconstructed CUs, is stored in the storage component 1412 for use by the intra-prediction component 1414.

The in-loop filtering component 1416 applies various filters to the reconstructed sub-picture data to improve the quality of the decoded pictures and the quality of the reference picture data used for decoding of subsequent pictures. The in-loop filters are the same as those of the encoder, which may be, for example, a deblocking filter, a sample adaptive offset filter (SAO), and an adaptive loop filter (ALF). The in-loop filters may be applied on an LCU-by-LCU basis and the final filtered reference picture data is provided to the storage component 1412. In some embodiments, the ALF component 1420 is not present.

The boundary processing component 1418 applies the in-loop filtering to the sub-picture boundaries after the sub-pictures for a picture are decoded by the sub-picture decoders and stored in the storage 1412. More specifically, the boundary processing component 1418 reads the decoded picture data for blocks along the sub-picture boundaries and applies the in-loop filters (the same filters as used by the in-loop filtering component 1416) across the boundaries. To enable this boundary filtering, information regarding boundary blocks such as motion data (motion vectors, reference picture indices, etc.), whether blocks are intra-coded or inter-coded, and CU/PU/TU partitioning and flags indicating whether or not TUs contain non-zero coefficients, is stored in the storage 1412 by each of the sub-picture decoders. The boundary processing 1418 also outputs the final reconstructed pictures after application of the filters to the sub-picture boundaries.

For applications such as video conferencing, low-latency on the decoder side is an important factor. With the sub-picture entry signaling technique discussed above, at least one picture delay is needed for parallel decoding of sub-pictures as the encoded data of the sub-pictures is placed in the compressed bit stream in sub-picture raster scan order. To overcome this latency issue, in some embodiments, slices of the sub-pictures are output in the compressed bit stream in an interleaved fashion. More specifically, each sub-picture is assigned a unique identifier in the range of 0 to the number of sub-pictures–1. For example, for the picture of FIG. 12 with four sub-pictures, the unique identifiers for the sub-pictures would range from 0 to 3.

In some embodiments, this unique identifier is encoded in the slice header of each slice of a sub-picture. Table 5 shows an example of a slice header syntax element specification that includes signaling of a sub-picture identifier. The slice_substream_id is the sub-picture identifier. If a slice is part of a sub-picture k (k=0, 1, . . . , number of sub-pictures–1) in a picture, the value of slice_substream_id is set to k. In this particular example, slice_substream_id is the first syntax element in a slice header so that the decoder can quickly decode this syntax element without needing to parse through additional slice header data, and dispatch the sub-bit stream corresponding to the slice to the decoder core decoding the particular sub-picture.

TABLE 5

```
slice_header( ) {
    If ( tiles_or_entropy_coding_sync_idc == 1 &&
    (num_subpic_columns> 1
|| num_subpic_row) ) {
        slice_substream_id
    }
        first_slice_in_pic_flag
        if( first_slice_in_pic_flag = = 0 )
            slice_address
        slice_type
....
```

Figure 15:
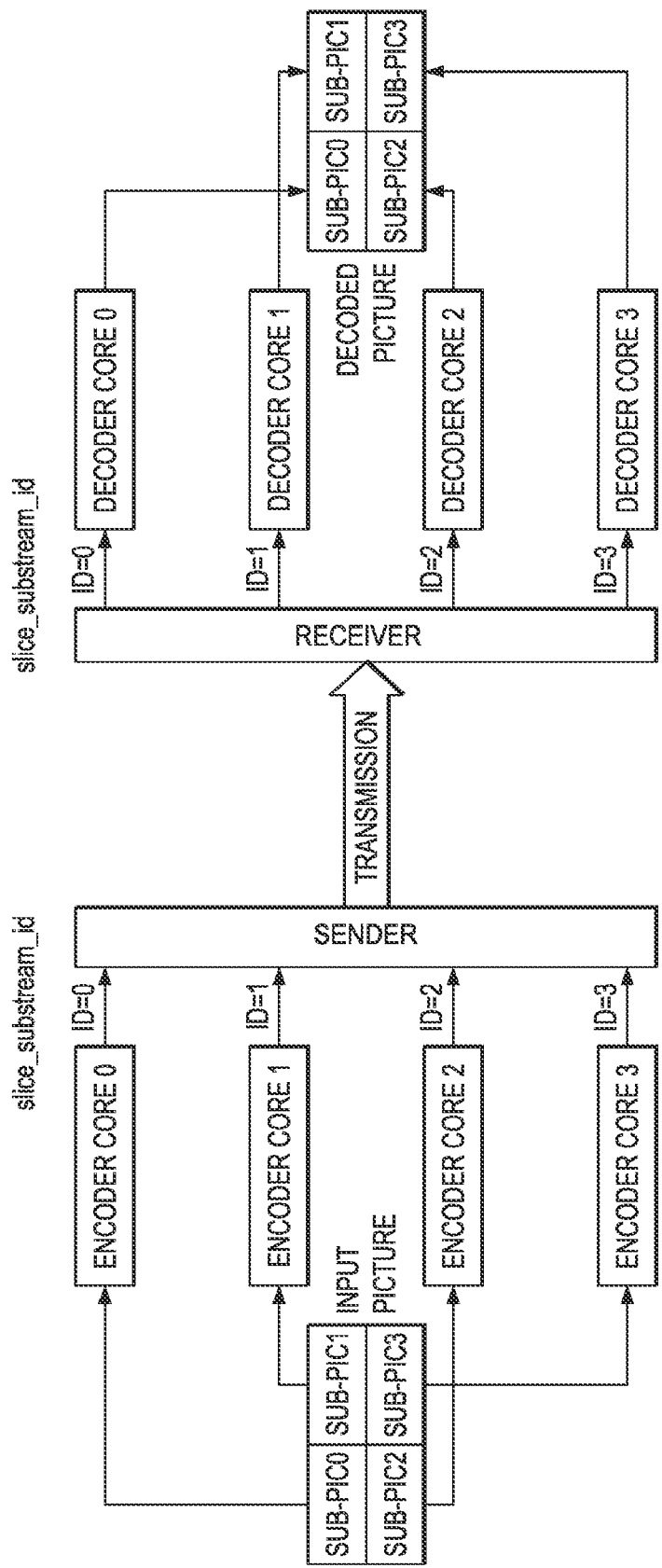
FIG. 15 is an example illustrating use of sub-picture identifiers in slice headers on a multi-core encoder/decoder platform.

With the signaling of the sub-picture identifiers in slice headers, low-latency encoding and decoding can be realized on multi-core encoder/decoder platforms such as those of FIGS. 7 and 14. For example, as illustrated in FIG. 15, an input picture of a video stream may be divided into four sub-pictures of equal size, each of which are encoded by four sub-picture encoder cores in parallel. Each sub-picture encoder core inserts a "slice_substream_id" into the slice header of the slices generated for the respective sub-pictures.

On the encoder side, the sender transmits the slices of the sub-pictures to the receiver as the slices become available from the encoder cores. On the decoder side, the receiver receives the bit stream, decodes the "slice_substream_id", and dispatches each slice to a sub-picture decoder core decoding the corresponding sub-picture. In this way, the sub-pictures can be decoded in parallel by four video decoder cores. While slices are still encoded, transmitted and decoded in raster scanning order within a sub-picture, i.e., data processing order is from left to right and from top to bottom of a sub-picture, the slices from different sub-pictures are transmitted in "interleaved" order to ensure low-latency.

Referring again to the multi-core encoder of FIG. 7, in an embodiment providing the inter-leaving of slices of sub-pictures, the encoder control component 700 may assign a sub-picture identifier to each sub-picture of a picture and communicate the identifier of a sub-picture to a sub-picture encoder along with the sub-picture data. Each sub-picture encoder may then include this identifier in the headers of slices of the sub-picture it is encoding. As each slice is encoded, a sub-picture encoder may make the slice available to the bit stream control component 740 for inclusion in the compressed bit stream. The bit stream control component 740 then includes the encoded slices in an interleaved fashion in the bit stream.

Referring again to the multi-core decoder of FIG. 14, in an embodiment, the decoder may expect that the slices of sub-pictures, i.e., slice sub-bit streams, are interleaved in a compressed bit stream. The decoder control component 1400 may parse the header of each incoming slice and direct the slice sub-bit stream to the appropriate sub-picture decoder, i.e., to the sub-picture decoder decoding the sub-picture identified in the slice header.

In some embodiments, both sub-picture entry signaling and sub-picture identifier signaling may be supported in encoding and decoding. In such embodiments, a suitable signaling protocol may be used to identify which signaling technique is used.

Figure 16:
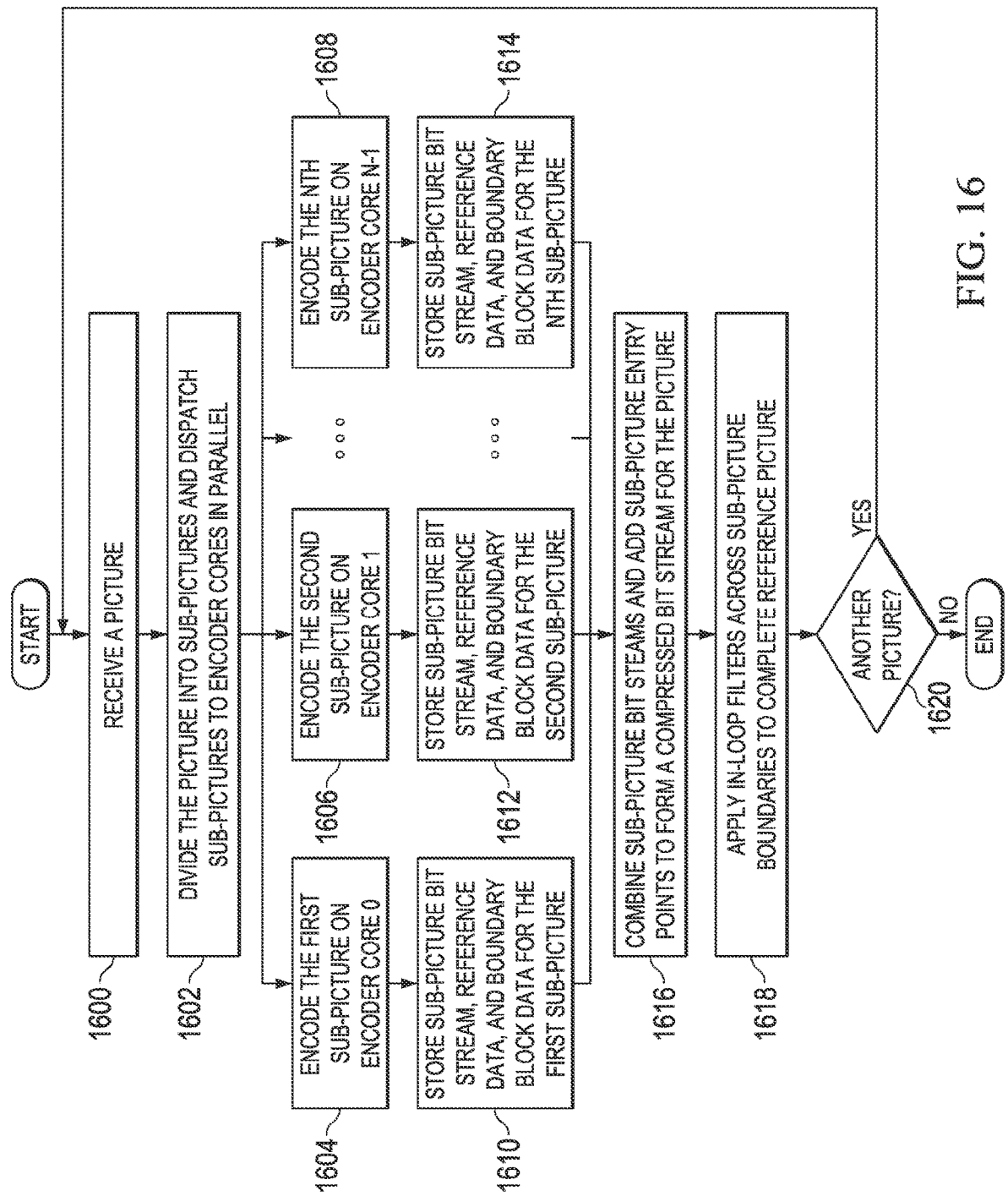
FIGS. 16-19 are flow diagrams of methods.

FIG. 16 is a flow diagram of a method for encoding pictures of a digital video sequence on a multi-core video encoder having N encoder cores. For simplicity of explanation, this method assumes that the number of sub-pictures required for a picture is also N and that the encoder cores are capable of encoding a sub-picture at the appropriate pixel rate and picture size. One of ordinary skill in the art, having benefit of this disclosure, will understand method embodiments in which a multi-core encoder has more or fewer encoder cores than the required number of sub-pictures and/or encoder cores that are not capable of encoding a sub-picture at the appropriate pixel rate and picture size.

Initially, a picture is received 1600 by the multi-core encoder, divided 1602 into N sub-pictures of as close to the same size as possible, and the N sub-pictures are dispatched to N sub-picture encoder cores. The number of sub-pictures into which the picture is divided is determined based on the profile and level being used for encoding the video sequence. Determining the number of sub-pictures and the sizes of sub-pictures based on a level is previously described herein. Division of a picture into N sub-pictures is also previously described herein.

The sub-pictures are then encoded 1604, 1606, 1608 in parallel on the respective sub-picture encoder cores. Encoding of a sub-picture on a sub-picture encoder core is previously described herein. The encoding of a sub-picture on each core generates a compressed sub-bit stream for the sub-picture, i.e., a sub-picture bit stream, and reference data for the sub-picture. The sub-picture bit stream and the reference data are stored 1610, 1612, 1614 for each sub-picture. Note that the reference data from the sub-pictures is combined to form a reference picture. Further, boundary block data for each sub-picture is stored. Examples of boundary block data are previously described herein.

Once the sub-picture bit streams for the picture are available, these sub-bit streams are combined 1616 in sub-picture raster scan order to form a compressed bit stream for the picture that is output as part of the compressed bit stream for the video sequence. Boundary processing is also performed on the reference picture. That is, one or more in-loop filters are applied 1618 across the sub-picture boundaries of the reference picture using the stored boundary block data. In-loop filters are previously discussed herein. The next picture, if any 1620, is then encoded.

Figure 17:
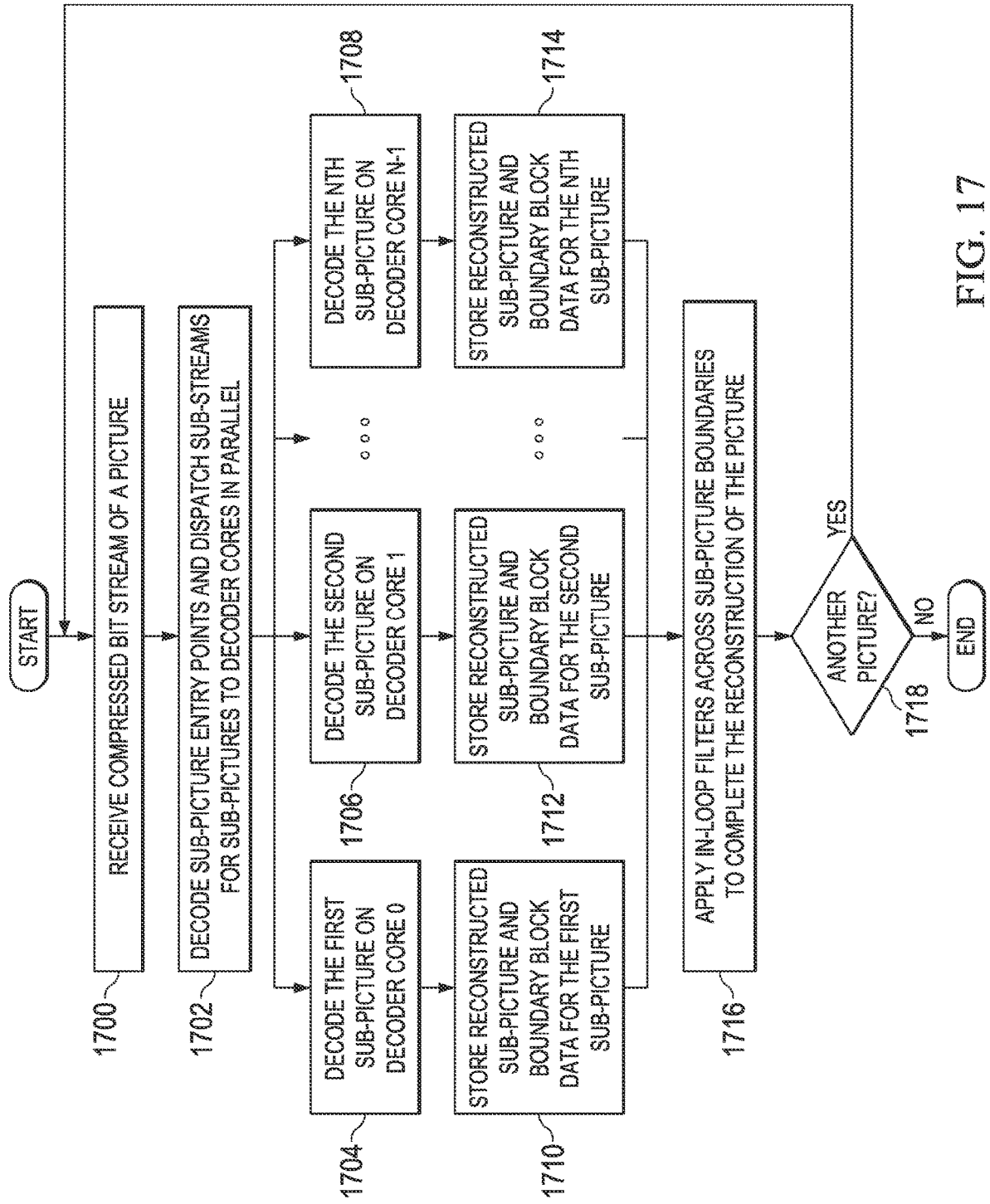

FIG. 17 is a flow diagram of a method for decoding pictures from a compressed video bit stream on a multi-core video decoder having N decoder cores. For simplicity of explanation, this method assumes that the number of sub-pictures in an encoded picture is also N and that the decoder cores are capable of decoding a sub-picture at the appropriate pixel rate and picture size. One of ordinary skill in the art, having benefit of this disclosure, will understand method embodiments in which a multi-core decoder has more or fewer decoder cores than the required number of sub-pictures and/or decoder cores that are not capable of decoding a sub-picture at the appropriate pixel rate and picture size.

Initially, the portion of a compressed bit stream corresponding to a picture is received 1700. Next, N sub-picture entry points are decoded 1702 from the bit stream, and the N sub-picture bit streams are dispatched to N sub-picture decoder cores in parallel. Signaling of sub-picture entry points in a compressed bit stream is previously described herein.

The sub-picture bit streams are then decoded 1704, 1706, 1708 in parallel on the respective sub-picture decoder cores. Decoding of a sub-picture bit stream on a sub-picture decoder core is previously described herein. The decoding of a sub-picture on each core generates a reconstructed sub-picture. Each reconstructed sub-pictures is stored 1710, 1712, 1714 for further processing. Note that the reconstructed sub-pictures are combined to form the reconstructed picture. Further, boundary block data for each sub-picture is stored. Examples of boundary block data are previously described herein.

Once the sub-pictures for the picture are decoded, boundary processing is performed on the reconstructed picture. That is, one or more in-loop filters are applied 1716 across the sub-picture boundaries of the reconstructed picture using the stored boundary block data. In-loop filters are previously discussed herein. The final reconstructed picture may then be output as part of the decompressed video sequence and may also be used as a reference picture. The next picture, if any 1718, is then decoded.

Figure 18:
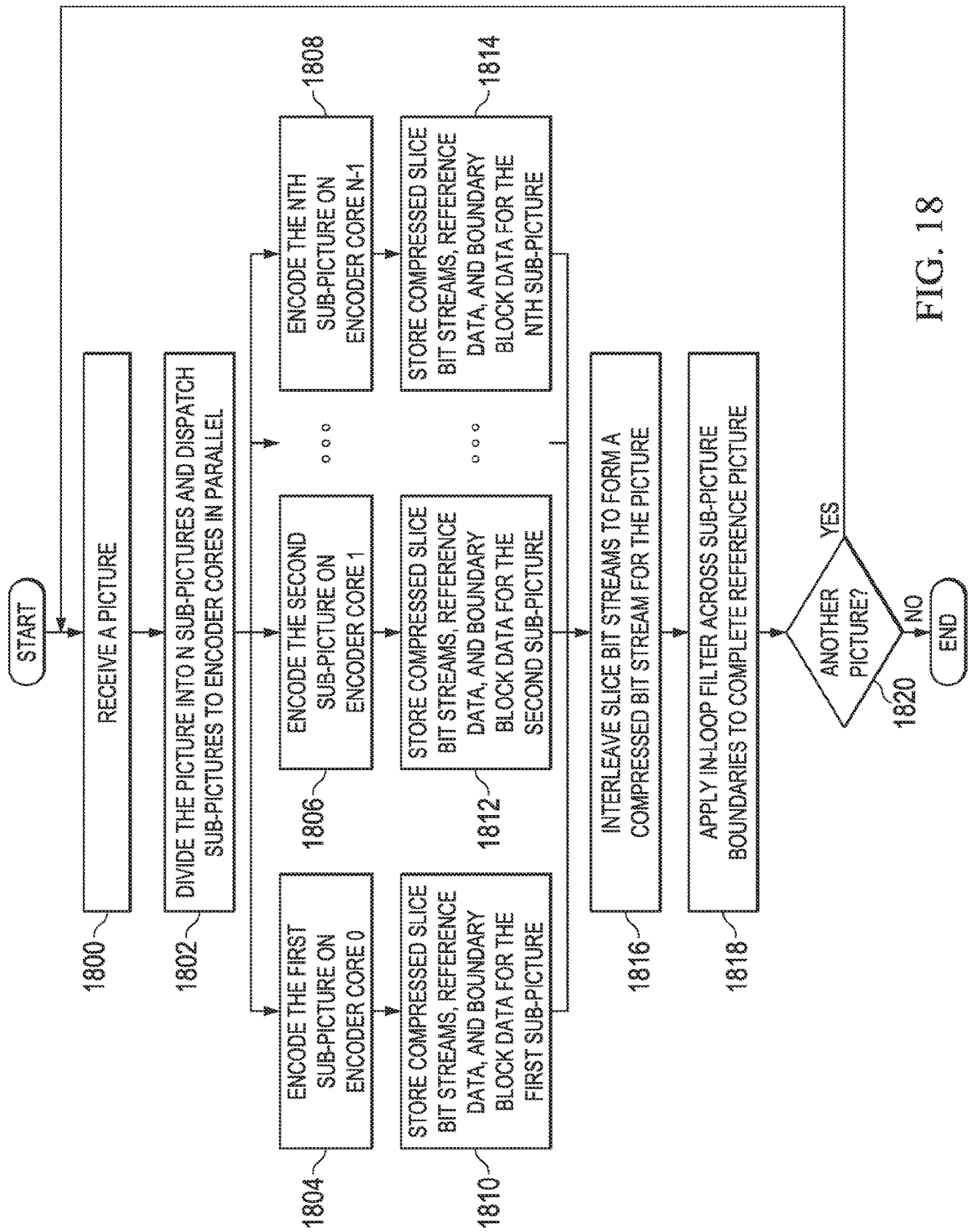

FIG. 18 is a flow diagram of a method for encoding pictures of a digital video sequence on a multi-core video encoder having N encoder cores. For simplicity of explanation, this method assumes that the number of sub-pictures required for a picture is also N and that the encoder cores are capable of encoding a sub-picture at the appropriate pixel rate and picture size. One of ordinary skill in the art, having benefit of this disclosure, will understand method embodiments in which a multi-core encoder has more or fewer encoder cores than the required number of sub-pictures and/or encoder cores that are not capable of encoding a sub-picture at the appropriate pixel rate and picture size.

Initially, a picture is received 1800 by the multi-core encoder, divided 1802 into N sub-pictures of as close to the same size as possible, and the N sub-pictures are dispatched to N sub-picture encoder cores. The number of sub-pictures into which the picture is divided is determined based on the profile and level being used for encoding the video sequence. Determining the number of sub-pictures and the sizes of sub-pictures based on a level is previously described herein. A unique sub-picture identifier is also assigned to each of the N sub-pictures. Sub-picture identifiers are previously described herein.

The sub-pictures are then encoded 1804, 1806, 1808 in parallel on the respective sub-picture encoder cores. Encoding of a sub-picture on a sub-picture encoder core is previously described herein. As each slice of a sub-picture is encoded on a sub-picture encoder core, the sub-picture identifier for the sub-picture is signaled in the slice header. The encoding of slices on each core generates a series of compressed slice bit streams for each sub-picture and reference data for each sub-picture. The compressed slice bit streams and the reference data are stored 1810, 1812, 1814 for each sub-picture. Further, each compressed slice bit stream is stored as it is completed. Note that the reference data from the sub-pictures is combined to form a reference pictures. Further, boundary block data for each sub-picture is stored. Examples of boundary block data are previously described herein.

As the slice bit streams become available from the encoder cores, the slice bit streams are interleaved 1816 to form a compressed bit stream for the picture that is output as part of the compressed bit stream for the video sequence. The slice bit streams may be output without waiting for the entire picture to be encoded. Boundary processing is also performed on the reference picture. That is, one or more in-loop filters are applied 1818 across the sub-picture boundaries of the reference picture using the stored boundary block data. In-loop filters are previously discussed herein. The next picture, if any 1820, is then encoded.

Figure 19:
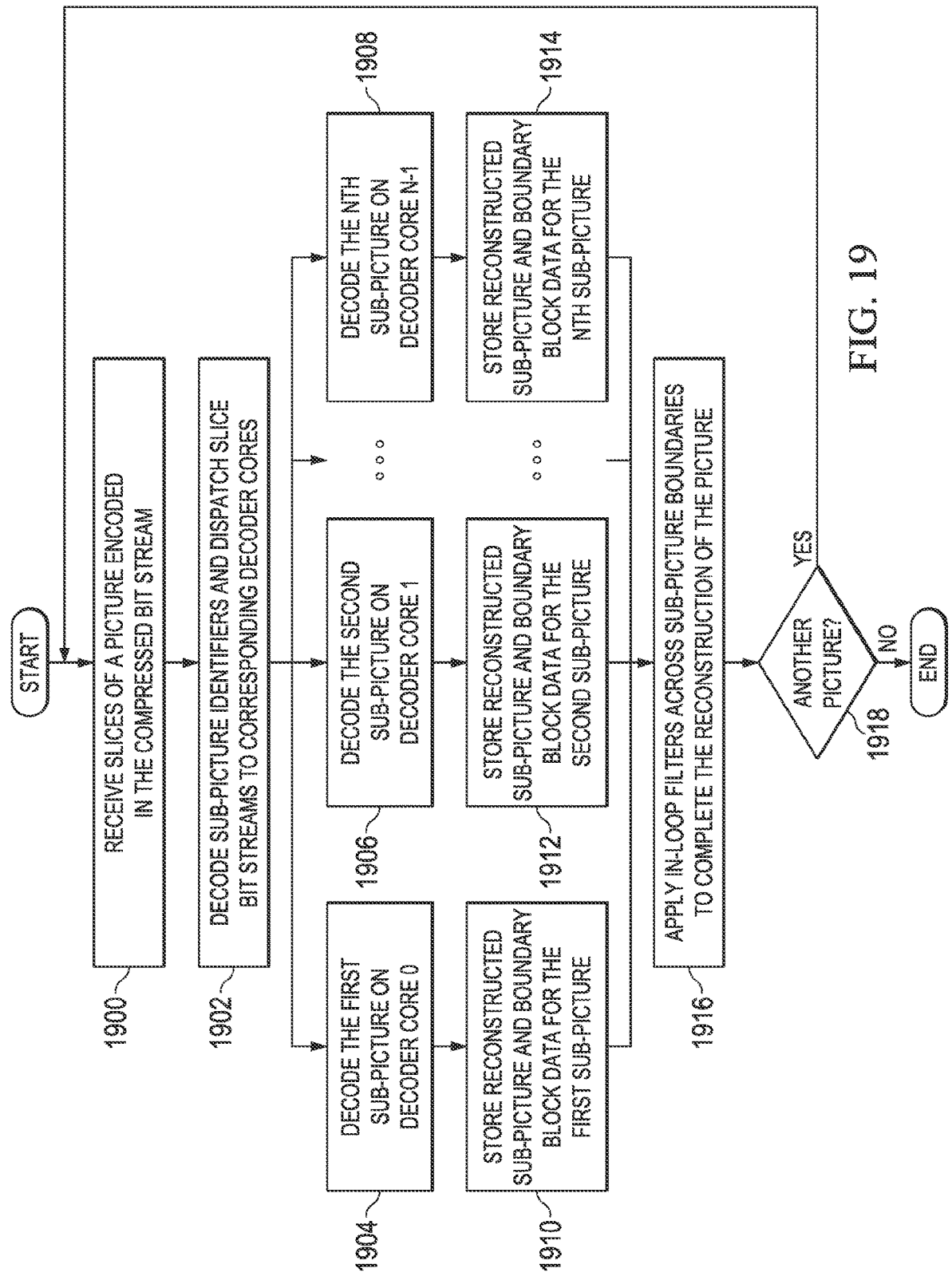

FIG. 19 is a flow diagram of a method for decoding pictures from a compressed video bit stream on a multi-core video decoder. For simplicity of explanation, this method assumes that the number of sub-pictures in an encoded picture is also N and that the decoder cores are capable of decoding a sub-picture at the appropriate pixel rate and picture size. One of ordinary skill in the art, having benefit of this disclosure, will understand method embodiments in which a multi-core decoder has more or fewer decoder cores than the required number of sub-pictures and/or decoder cores that are not capable of decoding a sub-picture at the appropriate pixel rate and picture size.

Initially, the slices of a picture encoded in the compressed bit stream are received 1900. The number N of sub-pictures in a picture and the range of sub-picture identifiers is also determined and each sub-picture is assigned to a sub-picture decoder core. Next, the sub-picture identifiers are decoded 1902 from slice headers in the bit stream, and the corresponding slice sub-bit streams are dispatched the appropriate sub-picture decoder core, i.e., a slice sub-bit stream is dispatched to the sub-picture decoder core being used to decode the sub-picture corresponding to the sub-picture identifier in slice header of the slice sub-bit stream. As previously described, the slice bit streams for the sub-pictures are interleaved in the compressed bit stream during encoding. Signaling of sub-picture identifiers in slice headers in a compressed bit stream is previously described herein.

The slice bit streams are then decoded 1904, 1906, 1908 in parallel on the respective sub-picture decoder cores. Decoding of sub-pictures on a sub-picture decoder core is previously described herein. The decoding of the slice bit streams of sub-pictures on each core generates a reconstructed sub-picture. The reconstructed sub-pictures are stored 1910, 1912, 1914 for each sub-picture. Note that the reconstructed sub-pictures are combined to form the reconstructed picture. Further, boundary block data for each sub-picture is stored. Examples of boundary block data are previously described herein.

Once the sub-pictures for the picture are decoded, boundary processing is performed on the reconstructed picture. That is, one or more in-loop filters are applied 1916 across the sub-picture boundaries of the reconstructed picture using the stored boundary block data. In-loop filters are previously discussed herein. The final reconstructed picture may then be output as part of the decompressed video sequence and may also be used as a reference picture. The next picture, if any 1918, is then decoded.

Figure 20:
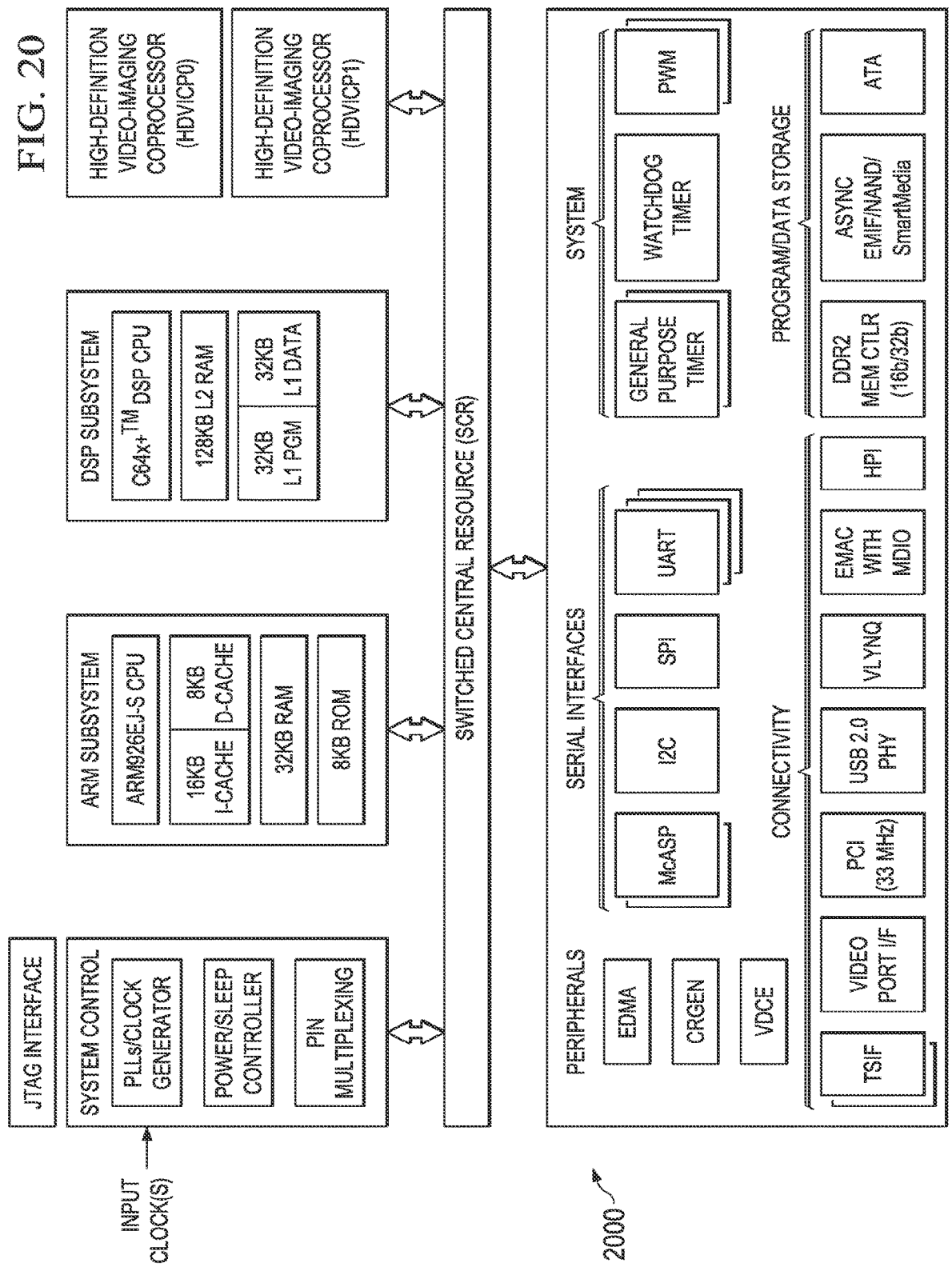
FIG. 20 is a block diagram of an illustrative processing core.

FIG. 20 is a block diagram of an example processor core suitable for use as a sub-picture encoder core in a multi-core video encoder (e.g., the encoder of FIG. 7) and/or or a sub-picture decoder core in a multi-core video decoder (e.g., the decoder of FIG. 14). This example processor core is also suitable for use as a boundary processing core in a multi-core video encoder or a multi-core video decoder. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 2000 is a programmable platform designed to meet the processing needs of applications such as video encode/decode/transcode/transrate, video surveillance, video conferencing, set-top box, medical imaging, media server, gaming, digital signage, etc. The SoC 2000 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 2000 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 2000, including the DSP subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 2000 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 20, the SoC 2000 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding and/or decoding such as motion estimation, motion compensation, intra-prediction, transformation, inverse transformation, quantization, and inverse quantization. Further, the distinct circuitry in the HDVICP coprocessors that may be used for specific computation operations is designed to operate in a pipeline fashion under the control of the ARM subsystem and/or the DSP subsystem.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, in some embodiments, the adaptation parameter set may not be defined in the coding standard. In such embodiments, information regarding sub-pictures described herein as being signaled in an adaptation parameter set may be signaled at another suitable location in the compressed bit stream, e.g., in a picture parameter set or in one or more supplemental enhancement information (SEI) messages.

In another example, embodiments have been described here in which sub-picture identifiers are signaled in the slice header of each slice of a sub-picture. The sub-picture identifies for slices may be signaled in other suitable ways. For example, the sub-picture identifier can be carried outside the compressed bit stream, such as in a packet header created when the compressed bit stream is packetized for transmission.

In another example, a sub-picture can be a uniformly spaced tile. That is, a coding standard can simply mandate a number of uniformly spaced tiles for each level to achieve sub-picture partitioning. Note that this approach would require minimal changes to the current HEVC standard. In such embodiments, the sub-picture (tile) entry points are also signaled, e.g., in one or more SEI messages, but the tile syntax can be directly utilized for sub-picture signaling as a sub-picture is a tile.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed by a processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

The invention claimed is:

1. A system comprising:
   a receiver configured to receive a bit stream including a parameter set and a slice header; and
   a decoder coupled to the receiver and configurable to:
      decode a first syntax element in the bit stream;
      decode a flag in the parameter set of the bit stream;
      decode a second syntax element in the slice header of the bit stream based on a value of the first syntax element and based on a value of the flag, wherein the second syntax element specifies a number of entry point offsets signaled in the slice header;
      determine that a value of the second syntax element is greater than zero;
      decode a third syntax element in the slice header in response to determining that the value of the second syntax element is greater than zero; and
      determine a first entry point offset based on the third syntax element.

2. The system of claim 1, wherein the decoder is further configurable to:
   decode a fourth syntax element in the slice header after decoding the third syntax element; and
   determine a second entry point offset relative to the first entry point offset based on the fourth syntax element.

3. The system of claim 2, wherein the decoder is further configurable to:
   decode a fifth syntax element in the slice header after decoding the fourth syntax element; and
   determine a third entry point offset relative to the second entry point offset based on the fifth syntax element.

4. The system of claim 1, wherein the decoder is further configurable to decode syntax elements representing entry point offsets up to a count equal to the value of the second syntax element.

5. The system of claim 1, wherein to determine the first entry point offset, the decoder is configurable to determine a distance between a start of the slice header and a start location of a first sub-picture in the bit stream based on the third syntax element.

6. The system of claim 1, wherein the decoder is configurable to decode an offset length syntax element in response to determining that the value of the second syntax element is greater than zero.

7. The system of claim 1, wherein the decoder is further configurable to decode syntax elements representing entry point offsets up to the number of entry point offsets specified by the second syntax element.

8. A method comprising:
   decoding a first syntax element in a bit stream;
   decoding a flag in a parameter set of the bit stream;
   decoding a second syntax element in a slice header of the bit stream based on a value of the first syntax element and based on a value of the flag, wherein the second syntax element specifies a number of entry point offsets signaled in the slice header;
   determining that a value of the second syntax element is greater than zero;
   decoding a third syntax element in the slice header in response to determining that the value of the second syntax element is greater than zero; and
   determining a first entry point offset based on the third syntax element.

9. The method of claim 8, further comprising:
   decoding a fourth syntax element in the slice header after decoding the third syntax element; and
   determining a second entry point offset relative to the first entry point offset based on the fourth syntax element.

10. The method of claim 9, further comprising:
    decoding a fifth syntax element in the slice header after decoding the fourth syntax element; and
    determining a third entry point offset relative to the second entry point offset based on the fifth syntax element.

11. The method of claim 8, further comprising decoding syntax elements representing entry point offsets up to a count equal to the value of the second syntax element.

12. The method of claim 8, wherein determining the first entry point offset comprises determining a distance between a start of the slice header and a start location of a first sub-picture in the bit stream based on the third syntax element.

13. The method of claim 8, further comprising decoding an offset length syntax element in response to determining that the value of the second syntax element is greater than zero.

14. The method of claim 8, further comprising decoding syntax elements representing entry point offsets up to the number of entry point offsets specified by the second syntax element.

15. A non-transitory computer-readable medium having executable instructions stored thereon, configured to be executable by one or more processors for causing the one or more processors to:
    decoding a first syntax element in a bit stream;
    decoding a flag in a parameter set of the bit stream;
    decode a second syntax element in a slice header of the bit stream based on a value of the first syntax element and based on a value of the flag, wherein the second syntax element specifies a number of entry point offsets signaled in the slice header;
    determine that a value of the second syntax element is greater than zero;

decode a third syntax element in the slice header in response to determining that the value of the second syntax element is greater than zero; and determine a first entry point offset based on the third syntax element.

16. The non-transitory computer-readable medium of claim 15, wherein the instructions are executable by the one or more processors for further causing the one or more processors to:

decode a fourth syntax element in the slice header after decoding the third syntax element; and determine a second entry point offset relative to the first entry point offset based on the fourth syntax element.

17. The non-transitory computer-readable medium of claim 16, wherein the instructions are executable by the one or more processors for further causing the one or more processors to:

decode a fifth syntax element in the slice header after decoding the fourth syntax element; and determine a third entry point offset relative to the second entry point offset based on the fifth syntax element.

18. The non-transitory computer-readable medium of claim 15, wherein the instructions are executable by the one or more processors for further causing the one or more processors to decode syntax elements representing entry point offsets up to a count equal to the value of the second syntax element.

19. The non-transitory computer-readable medium of claim 15, wherein the instructions to determine the first entry point offset comprises instructions to determine a distance between a start of the slice header and a start location of a first sub-picture in the bit stream based on the third syntax element.

20. The non-transitory computer-readable medium of claim 15, wherein the instructions are executable by the one or more processors for further causing the one or more processors to decode syntax elements representing entry point offsets up to the number of entry point offsets specified by the second syntax element.

* * * * *